(12) United States Patent
Kashiyama et al.

(10) Patent No.: US 10,617,983 B2
(45) Date of Patent: Apr. 14, 2020

(54) FILTER COUPLING DEVICE AND A SUBSTRATE TREATING APPARATUS HAVING SAME

(71) Applicant: SCREEN Holdings Co., Ltd., Kyoto (JP)

(72) Inventors: Masahito Kashiyama, Kyoto (JP); Akihiko Morita, Kyoto (JP)

(73) Assignee: SCREEN Holdings Co., Ltd. (JP)

( * ) Notice: Subject to any disclaimer, the term of this patent is extended or adjusted under 35 U.S.C. 154(b) by 83 days.

(21) Appl. No.: 15/334,647

(22) Filed: Oct. 26, 2016

(65) Prior Publication Data

US 2017/0120173 A1    May 4, 2017

(30) Foreign Application Priority Data

Oct. 29, 2015  (JP) .................................. 2015-213130

(51) Int. Cl.
*B01D 35/30*  (2006.01)

(52) U.S. Cl.
CPC ........... *B01D 35/306* (2013.01); *B01D 35/30* (2013.01); *B01D 2201/303* (2013.01); *B01D 2201/4007* (2013.01); *B01D 2201/4023* (2013.01)

(58) Field of Classification Search
CPC .................. B01D 35/306; B01D 35/30; B01D 2201/4023; B01D 2201/4007; B01D 2201/303
USPC .................................... 210/232, 238, 87, 91
See application file for complete search history.

(56) References Cited

U.S. PATENT DOCUMENTS

| 6,068,770 | A | 5/2000 | Niermeyer et al. ....... 210/321.6 |
| 2002/0179512 | A1 | 12/2002 | Axelrod ......................... 210/169 |
| 2012/0031821 | A1* | 2/2012 | Swain .................. B01D 35/147 210/87 |
| 2013/0240431 | A1* | 9/2013 | Foix ....................... B01D 35/30 210/232 |
| 2014/0263095 | A1* | 9/2014 | Rodriguez .............. E21B 37/06 210/749 |
| 2015/0113925 | A1 | 4/2015 | Gatica et al. |
| 2017/0066101 | A1 | 3/2017 | Yamaguchi ....................... 451/5 |

FOREIGN PATENT DOCUMENTS

| JP | H10-71326 A | 3/1998 |
| JP | 2003-251110 | 9/2003 |
| JP | 2010-144777 A | 7/2010 |
| JP | 2010-162047 A | 7/2010 |
| JP | 2014-195807 | 10/2014 |
| JP | 2015-085327 | 5/2015 |
| KR | 10-2006-0115436 | 11/2006 |

(Continued)

OTHER PUBLICATIONS

Office Action and Search Report for corresponding Korean Patent Application No. 10-2016-0141991 dated Dec. 20, 2017.

(Continued)

*Primary Examiner* — Madeline Gonzalez

(74) *Attorney, Agent, or Firm* — Ostrolenk Faber LLP

(57) ABSTRACT

A filter coupling device couples to a filter. The filter coupling device includes a plurality of joint members for connection to a plurality of connection openings of the filter. The filter coupling device also includes an arrangement switcher for switching an arrangement of the joint members between a first arrangement and a second arrangement.

5 Claims, 12 Drawing Sheets

(56) References Cited

FOREIGN PATENT DOCUMENTS

KR    10-2015-0055866     5/2015
TW       201538278 A    10/2015

OTHER PUBLICATIONS

Office Action and Search Report for corresponding Taiwan patent Application No. 105135076 dated Nov. 10, 2017.
Office Action dated Mar. 19, 2019 for corresponding Japanese Patent Application No. 2015-213130.

\* cited by examiner

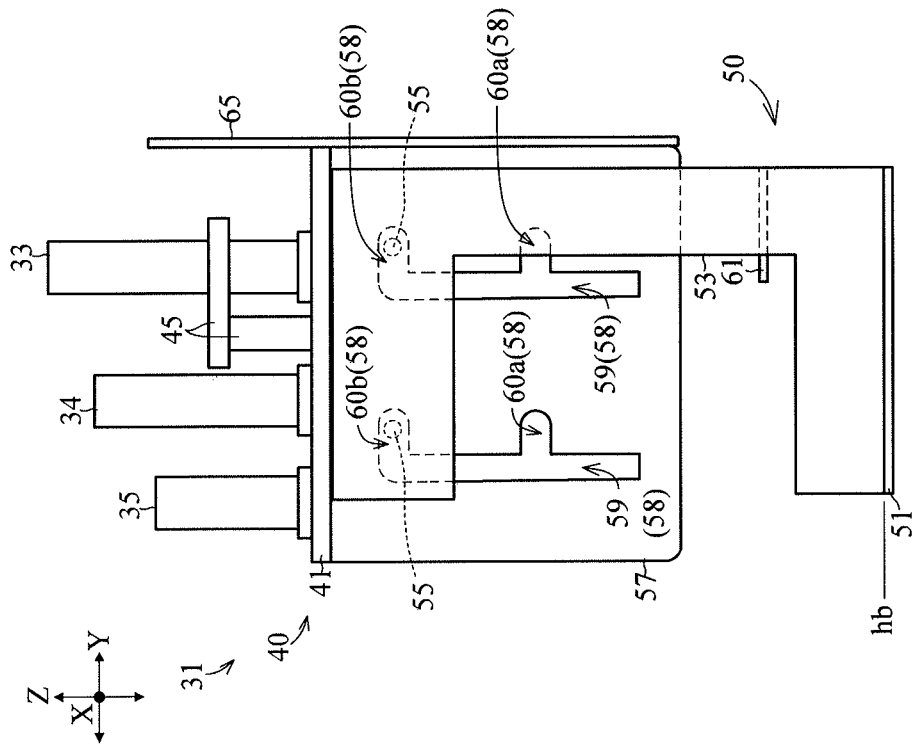
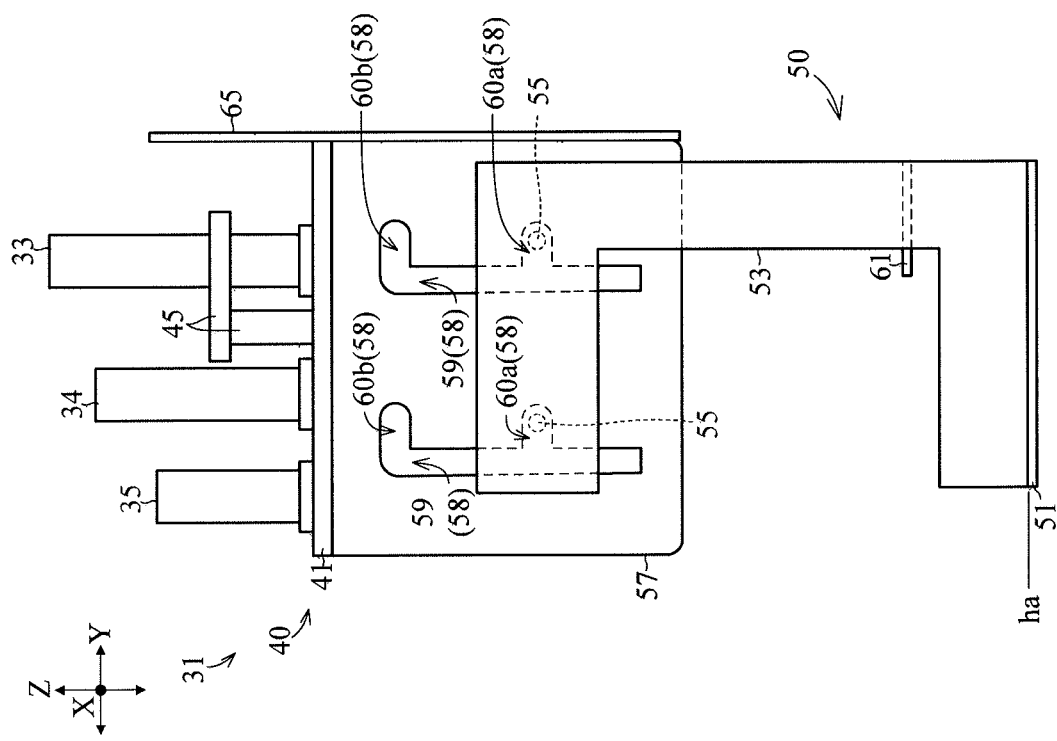

FILTER COUPLING DEVICE AND A SUBSTRATE TREATING APPARATUS HAVING SAME

CROSS-REFERENCED TO RELATED APPLICATIONS

This application claims priority to Japanese Patent Application No. 2015-213130 filed Oct. 29, 2015, the disclosure of which is hereby incorporated herein by reference in its entirety for all purposes.

BACKGROUND OF THE INVENTION (1) Field of the Invention

This invention relates to a filter coupling device for connection with a filter. This invention also relates to a substrate treating apparatus having the filter coupling device, which substrate treating apparatus is constructed to treat semiconductor wafers, glass substrates for photomasks, glass substrates for liquid crystal displays, substrates for optical disks, and so on (hereinafter called simply substrates).

(2) Description of the Related Art

The filter is mounted on a supply line for supplying a treating liquid to substrates, and filters the treating liquid. The filter has a filter body and a plurality of connection openings. One of the connection openings is, for example, an inlet for the treating liquid to flow into the filter body. Another connection opening is an outlet for the treating liquid to flow out of the filter body, for example.

A filter coupling device is used to install the filter in the supply line easily (as disclosed in Japanese Unexamined Patent Publications No. 2003-251110, No. 2015-85327 and No. 2014-195807, for example). The filter coupling device has a plurality of connection ports for connection with the plurality of connection openings. The connection ports are arranged in the same layout as the connection openings. When the filter is connected to the filter coupling device, the plurality of connection openings are connected all together to the connection ports to place the filter in communication with the supply line of the treating liquid.

SUMMARY OF THE INVENTION

However, the conventional examples with such construction have the following drawback.

The conventional filter coupling device is connectable only with a filter having connection ports arranged in a specific layout. Filters with the connection openings in different arrangements require different filter coupling devices for compatibility.

On the other hand, the arrangement of connection openings often varies with the filter manufacturer or the type of filter. This is because the arrangement of connection openings may influence the filter performance.

When a change is made between filters with the same arrangement of connection openings, there will usually occur no necessity to change the filter coupling device. However, when a change is made between filters with different arrangements of connection openings, the filter coupling device must also be changed. The conventional filter coupling device, therefore, causes an inconvenience that a change cannot be made easily between two or more types of filters with different arrangements of connection openings.

This invention has been made having regard to the state of the art noted above, and its object is to provide a filter coupling device which can be connected conveniently with two or more types of filters with different arrangements of connection openings, and a substrate treating apparatus having such filter coupling device.

To fulfill the above object, this invention provides the following construction.

A filter coupling device for coupling a filter, according to this invention comprises:
a plurality of connection ports for connection to a plurality of connection openings of the filter; and
an arrangement switcher for switching an arrangement of the connection ports between a first arrangement and a second arrangement.

The first arrangement and second arrangement are different from each other. The plurality of connection ports arranged in the first arrangement are connectable, respectively, to the plurality of connection openings provided in a specific arrangement. The plurality of connection ports arranged in the second arrangement are connectable with the plurality of connection openings provided in another specific arrangement. The first arrangement and second arrangement are determined beforehand in this way. Therefore, when the arrangement switcher has switched the arrangement of the connection ports to the first arrangement, the filter coupling device can conveniently be connected to a filter having the connection openings in the specific arrangement. When the arrangement switcher switches the arrangement of the connection ports to the second arrangement, the filter coupling device can conveniently be connected to a filter having the connection openings in the other specific arrangement. Thus, the filter coupling device with arrangement switcher can conveniently be connected to two or more types of filters having different arrangements of the connection openings. Therefore, change can easily be made between two or more types of filters having different arrangements of the connection openings.

In the invention described above, it is preferred that the arrangement switcher includes holders for holding the connection ports in predetermined positions. More particularly, it is preferred that the holders hold the plurality of connection ports in positions in the first arrangement and in positions in the second arrangement, respectively. The holders can conveniently prevent the arrangement of the connection ports shifting from the first arrangement, and can conveniently prevent the arrangement of the connection ports shifting from the second arrangement. Further, the holders can set the respective connection ports to right positions in the first arrangement, and can set the respective connection ports to right positions in the second arrangement. The holders can also conveniently prevent the connection ports shifting from the right positions.

In the invention described above, it is preferred that the arrangement switcher includes a moving unit for moving at least one of the connection ports. More particularly, it is preferred that the moving unit moves the connection port between a position in the first arrangement and a position in the second arrangement. The arrangement switcher with the moving unit can easily switch arrangements of the connection ports.

In the invention described above, it is preferred that the moving unit includes a cam member provided rotatable and in contact with the one of the connection ports. The cam member in rotation can move the connection port to appropriate positions.

In this invention described above, it is preferred that the single cam member moves at least two of the connection ports. Then, the number of cam members can be reduced, and the construction of the moving unit can be simplified.

In the invention described above, it is preferred that the arrangement switcher includes a moving unit lock for prohibiting the moving unit from moving the connection ports. More particularly, it is preferred that the moving unit lock sets the connection ports to positions in the first arrangement and positions in the second arrangement. The moving unit lock can make each connection port stand still in the right position in the first arrangement, and can make each connection port stand still in the right position in the second arrangement. The moving unit lock can also conveniently prevent the connection ports shifting from the right positions.

In the invention described above, it is preferred that the filter coupling device comprises a control unit interlocked to the moving unit for actuating the moving unit. The filter coupling device with the control unit can easily actuate the moving unit.

In the invention described above, it is preferred that the arrangement switcher includes a guide for guiding at least one of the connection ports. More particularly, it is preferred that the guide guides the connection port between a position in the first arrangement and a position in the second arrangement. The arrangement switcher with the guide can smoothly switch the positions of the connection port.

In the invention described above, it is preferred that a position of the one of the connection ports in contact with one end edge of the guide is a position of the one of the connection ports in either one of the first arrangement and the second arrangement. The one end edge of the guide is used to set the one of the connection ports guided by the guide to a particular position. The one end edge of the guide provides either one of a position of the connection port in the first arrangement and a position of the connection port in the second arrangement. The guide can therefore easily guide the connection port to at least either one of a position of the connection port in the first arrangement and a position of the connection port in the second arrangement.

In the invention described above, it is preferred that a position of the one of the connection ports in contact with one end edge of the guide is a position of the one of the connection ports in one of the first arrangement and the second arrangement; and that a position of the one of the connection ports in contact with the other end edge of the guide is a position of the one of the connection ports in the other of the first arrangement and the second arrangement. The one end edge and the other end edge of the guide are used to set the one of the connection ports guided by the guide to particular positions. Specifically, the one end edge of the guide provides a position of the connection port in one of the first arrangement and the second arrangement. The other end edge of the guide provides a position of the connection port in the other of the first arrangement and the second arrangement. Thus, both the end edges of the guide provide the position of the connection port in the first arrangement and the position of the connection port in the second arrangement. The guide can therefore easily guide the connection port to the respective positions in the first arrangement and second arrangement.

In the invention described above, it is preferred that the arrangement switcher includes stoppers attached to the guide for stopping the one of the connection ports in predetermined positions. More particularly, it is preferred that the stoppers stop the connection port in the position in the first arrangement and in the position in the second arrangement. The arrangement switcher with the stoppers can conveniently prevent the connection port shifting from the right position in the first arrangement, and can conveniently prevent the connection port shifting from the right position in the second arrangement. As a result, shifting of the arrangement of the connection ports can be prevented conveniently. Specifically, the arrangement of the connection ports can conveniently be maintained as the first arrangement, and can conveniently be maintained as the second arrangement.

In the invention described above, it is preferred that the filter coupling device comprises a filter support for supporting the filter; an up-and-down movement portion for allowing up-and-down movement of the filter support; and up-and-down movement locking portions for prohibiting the up-and-down movement of the filter support, respectively when the filter support is in a first height position and when the filter support is in a second height position. The filter coupling device with the filter support can conveniently support the filter. The filter coupling device with the up-and-down movement portion can conveniently allow up-and-down movement of the filter. The filter coupling device with the up-and-down movement locking portions can maintain the filter support in the first height position, and in the second height position different from the first height position. That is, the filter support can stably support the filter in the two different height positions. The filter coupling device can therefore connect with two or more types of filters having different heights.

In the invention described above, it is preferred that the filter coupling device comprises a base portion for supporting the filter support through the up-and-down movement portion; wherein the up-and-down movement portion includes groove portions for up-and-down movement formed in one of the base portion and the filter support to extend vertically; and pin members fixed to the other of the base portion and the filter support to be slidable along the groove portions for up-and-down movement; the up-and-down movement locking portions include groove portions for first locking formed in one of the base portion and the filter support to extend substantially horizontally from the groove portions for up-and-down movement and to allow sliding of the pin members; and groove portions for second locking formed in one of the base portion and the filter support to extend substantially horizontally from the groove portions for up-and-down movement and to allow sliding of the pin members; the groove portions for first locking and the groove portions for second locking being located at different heights. In the filter coupling device with the base portion, the up-and-down movement portion can allow the filter support to move up and down relative to the base portion. The up-and-down movement portion includes the groove portions for up-and-down movement, and the pin members engaged in the groove portions for up-and-down movement. The pin members sliding along the groove portions for up-and-down movement can conveniently move the filter support up and down. The up-and-down movement locking portions include the groove portions for first locking and the groove portions for second locking. The groove portions for first and second locking are connected to the groove portions for up-and-down movement. When the pin members enter the groove portions for first and second locking, the pin members cannot move up and down, and the up-and-down movement portion cannot move the filter support up and down. That is, the filter support is maintained in a fixed height position. The groove portions for first locking and the groove portions for second locking are formed in height positions different from each other. Therefore, the filter support can be maintained in the first height position, and in the second height position different from the first height position.

In the invention described above, it is preferred that the arrangement switcher includes a transmission unit for transmitting to the moving unit a force applied by a user to the control unit. This enables omission of a power source for driving the moving unit, thereby to further simplify the construction of the arrangement switcher.

In another aspect of this invention, a substrate treating apparatus is provided which comprises a filter coupling device for coupling a filter, wherein the filter coupling device includes:

a plurality of connection ports for connection to a plurality of connection openings of the filter; and an arrangement switcher for switching an arrangement of the connection ports between a first arrangement and a second arrangement.

The filter coupling device can conveniently be connected to two or more types of filters different in arrangement of the connection openings. The substrate treating apparatus with such filter coupling device can easily change between two or more types of filters different in arrangement of the connection openings. Therefore, according to types of substrates, types of treating liquid, or types of treatment given to the substrates, filters can easily be selected or changed, and the treating liquid can be filtered more appropriately. Therefore, the treatment quality of substrates can be further improved.

BRIEF DESCRIPTION OF DRAWINGS

For the purpose of illustrating the invention, there are shown in the drawings several forms which are presently preferred, it being understood, however, that the invention is not limited to the precise arrangement and instrumentalities shown.

FIGS. 8A and 8B are views illustrating height positions of a filter support;

DESCRIPTION OF THE PREFERRED EMBODIMENTS

Embodiments of this invention will be described hereinafter with reference to the drawings.

Figure 1:
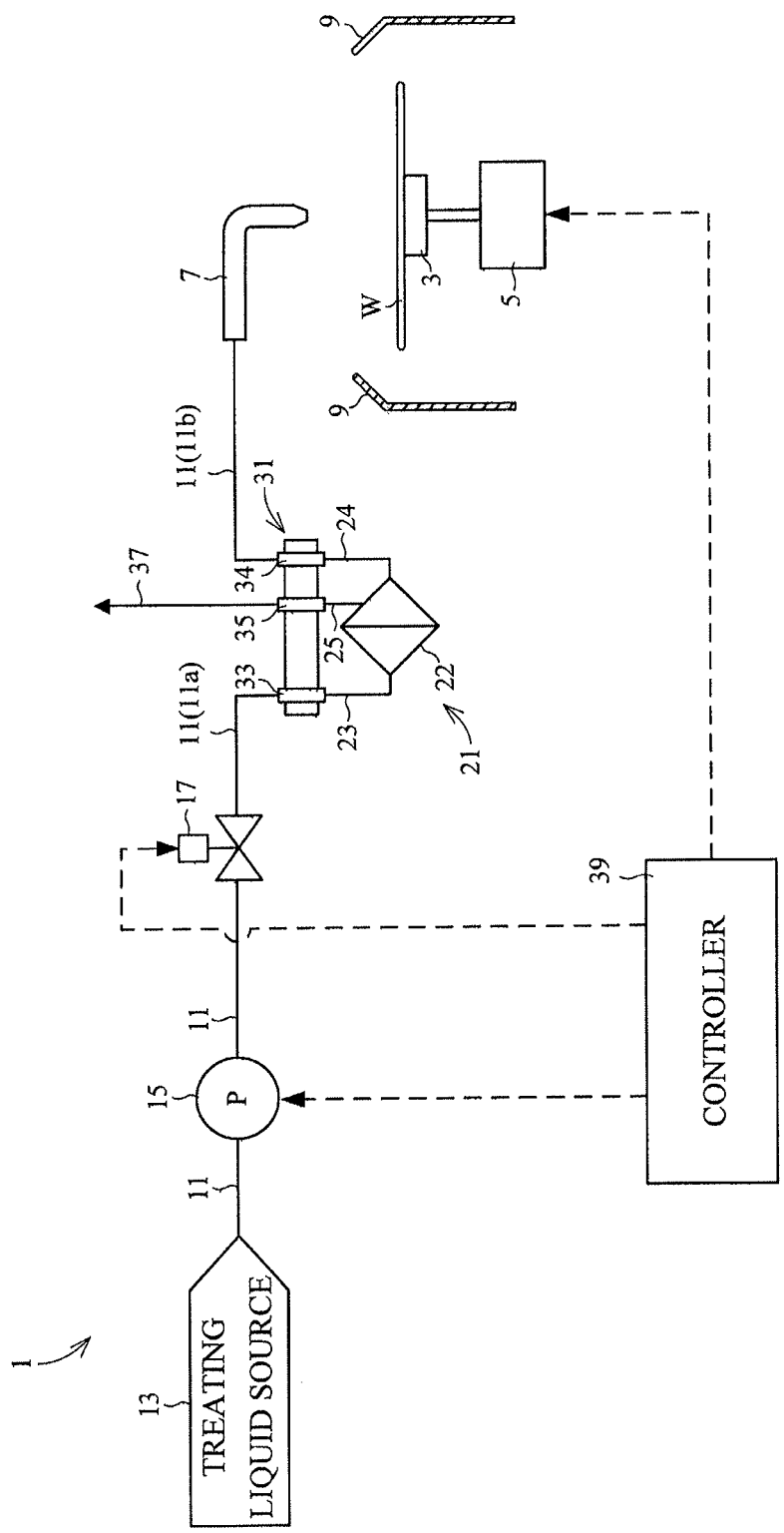
FIG. 1 is a view showing an outline construction of a substrate treating apparatus according to Embodiment 1.

FIG. 1 is a view showing an outline construction of a substrate treating apparatus according to Embodiment 1.

The substrate treating apparatus 1 according to Embodiment 1 is an apparatus for treating substrates (e.g. semiconductor wafers) W with a liquid.

<Outline of Substrate Treating Apparatus 1>

The substrate treating apparatus 1 includes a substrate holder 3 and a spin motor 5. The substrate holder 3 holds a wafer W substantially horizontally. The substrate holder 3 holds the back side (lower surface) of the wafer W by suction, for example. The spin motor 5 is connected to the center of a bottom of the substrate holder 3. The spin motor 5 spins the substrate holder 3 about a substantially vertical axis. Consequently, the wafer W held by the substrate holder 3 spins about the substantially vertical axis passing through the center the wafer W.

The substrate treating apparatus 1 further includes a nozzle 7 and a cup 9. The nozzle 7 is provided movable to a discharge position above the substrate holder 3. The nozzle 7 discharges a treating liquid to the wafer W held by the substrate holder 3. The cup 9 is disposed to surround laterally of the substrate holder 3. The cup 9 catches and collects the treating liquid scattering from the wafer W.

The nozzle 7 is connected to piping 11 which delivers the treating liquid. The other end of the piping 11 is connected to a treating liquid supply source 13. The treating liquid supply source 13 is, for example, a treating liquid tank storing the treating liquid. The treating liquid is, for example, a resist film material, a varied type of film material, a chemical solution, thinner or deionized water. The piping 11 has a pump 15, a control valve 17 and a filter 21 mounted in intermediate positions thereof. The pump 15 feeds under pressure the treating liquid from the treating liquid supply source 13 toward the nozzle 11. The control valve 17 opens and closes the flow path of the treating liquid. The filter 21 filters the treating liquid. The filter 21 separates and removes foreign substances from the treating liquid, for example.

The filter 21 has a filter body 22 and a plurality of (e.g. three) connection openings 23, 24 and 25. The filter body 22 includes a filtering material, a primary flow path where the treating liquid flows through a primary side of the filtering material, and a secondary flow path where the treating liquid flows through a secondary side of the filtering material (none being shown). The filtering material is a porous film, for example. The connection opening 23 is an inlet to the primary flow path. The connection opening 24 is an outlet from the secondary flow path. The connection opening 25 is an outlet for letting gas out of the filter body 22.

The filter 21 is connected to the piping 11 by a filter coupling device 31. The filter coupling device 31 has a plurality (e.g. the same in number as the connection openings) of joint members 33, 34 and 35. The joint members 33, 34 and 35 are connected, each at one end thereof, to the connection openings 23, 24 and 25. The joint members 33, 34 and 35 are examples of the connection ports in this invention.

For convenience, here, the portion of piping 11 on the primary side of the filter 21 will be called "primary piping 11a", and that on the secondary side of the filter 21 "secondary piping 11b." The primary piping 11a is connected to the other end of the joint member 33. Consequently, the primary piping 11a is connected to the connection opening 23 through the joint member 33. The secondary piping 11b is connected to the other end of the joint member 34. Consequently, the secondary piping 11b is connected to the connection opening 24 through the joint member 34. The other end of the joint member 35 is connected to a vent pipe 37. Consequently, the vent pipe 37 is connected to the connection opening 25 through the joint member 35.

The substrate treating apparatus 1 has a controller 39. The controller 39 performs overall control of the rotation of the spin motor 5, movement of the nozzle 7, driving of the pump 15, and opening and closing of the control valve 17. The control by the controller 39 is performed based on a processing recipe set beforehand.

Operation of the substrate treating apparatus 1 for treating the wafer W with the liquid will be described briefly.

When the wafer W is placed on the substrate holder 3, the spin motor 5 will spin the wafer W. The nozzle 7 moves to the discharge position. The pump 15 feeds the treating liquid under pressure, and the control valve 17 opens the flow path of the treating liquid. Consequently, the treating liquid flows from the treating liquid supply source 13 through the primary piping 11a into the filter 21. The filter 21 filters the treating liquid. The filtered treating liquid flows from the filter 21 through the secondary piping 11b into the nozzle 7. The nozzle 7 discharges the treating liquid to the wafer W. The treating liquid is supplied to the center of the surface of the spinning wafer W, and spreads over the entire surface of the wafer W. The treating liquid scattering from the wafer W is collected by the cup 9.

Upon elapse of a predetermined time after start of the discharge of the treating liquid, the pump 15 is stopped and the control valve 17 is closed to stop the supply of the treating liquid to the wafer W. The spin motor 5 spins the wafer W at higher speed to dry the wafer W. Then, the spin motor 5 stops to bring the wafer W to a standstill. This completes the liquid treatment of the wafer W.

<Constructions of Filter 21>

The constructions of two types of filter 21 will be described by way of example.

Figure 2A:
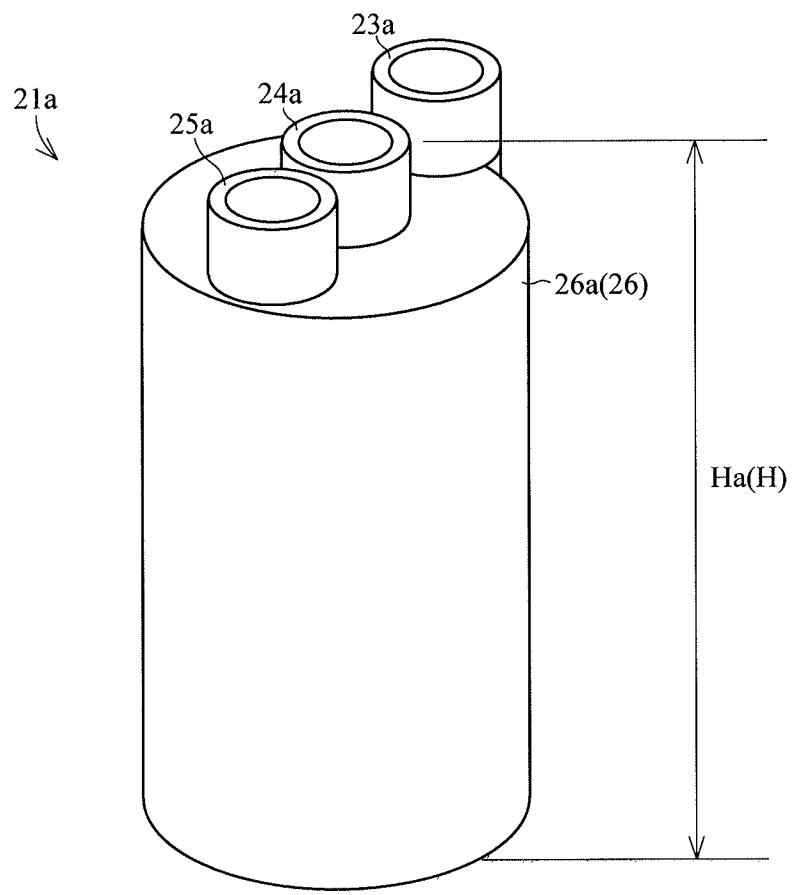
FIG. 2A is a perspective view of a first filter.
Figure 2B:
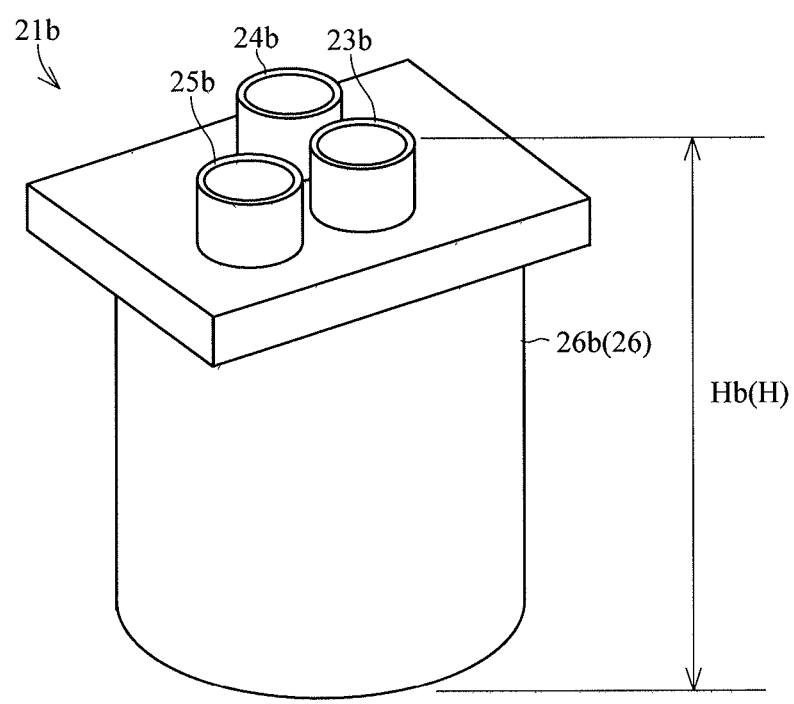
FIG. 2B is a perspective view of a second filter.

FIG. 2A is a perspective view of a first example of filter 21. FIG. 2B is a perspective view of a second example of filter 21. In the following description, the first example of filter 21 will be called "first filter 21a", and the second example of filter 21 "second filter 21b." The sign of each element of the first filter 21a will be affixed with "a" as appropriate, and the sign of each element of the second filter 21b with "b".

Reference is made to FIG. 2A. The first filter 21a has connection openings 23a, 24a and 25a and a housing 26a. The housing 26a accommodates the filter body 22 noted hereinbefore. The connection openings 23a, 24a and 25a are formed in an upper surface of the housing 26a. The connection openings 23a, 24a and 25a are arranged in a row. The connection openings 23a, 24a and 25a are shaped tubular, respectively.

Reference is made to FIG. 2B. The second filter 21b has connection openings 23b, 24b and 25b and a housing 26b. The housing 26b accommodates the filter body 22 noted hereinbefore. The connection openings 23b, 24b and 25b are formed in an upper surface of the housing 26b. The connection openings 23b, 24b and 25b are not arranged in a row. The connection openings 23b, 24b and 25b are arranged in positions corresponding to the three vertices of a right triangle, respectively. The connection openings 23b, 24b and 25b are shaped tubular, respectively.

Thus, the arrangements of connection openings 23, 24, and 25 are different between the first filter 21a and second filter 21b.

The heights H of the filters 21 are different between the first filter 21a and second filter 21b. In this Embodiment 1, height Ha of the first filter 21a is larger than height Hb of the second filter 21b. Here, the heights H of the filters 21 are lengths in the vertical direction from the bottom of the housing 26 to upper ends of the connection openings 23-25.

<Construction of Filter Coupling Device 31>

The filter coupling device 31 has a construction that can be connected with both the first filter 21a and second filter 21b. Its construction will be described in detail hereinafter.

Figure 3:
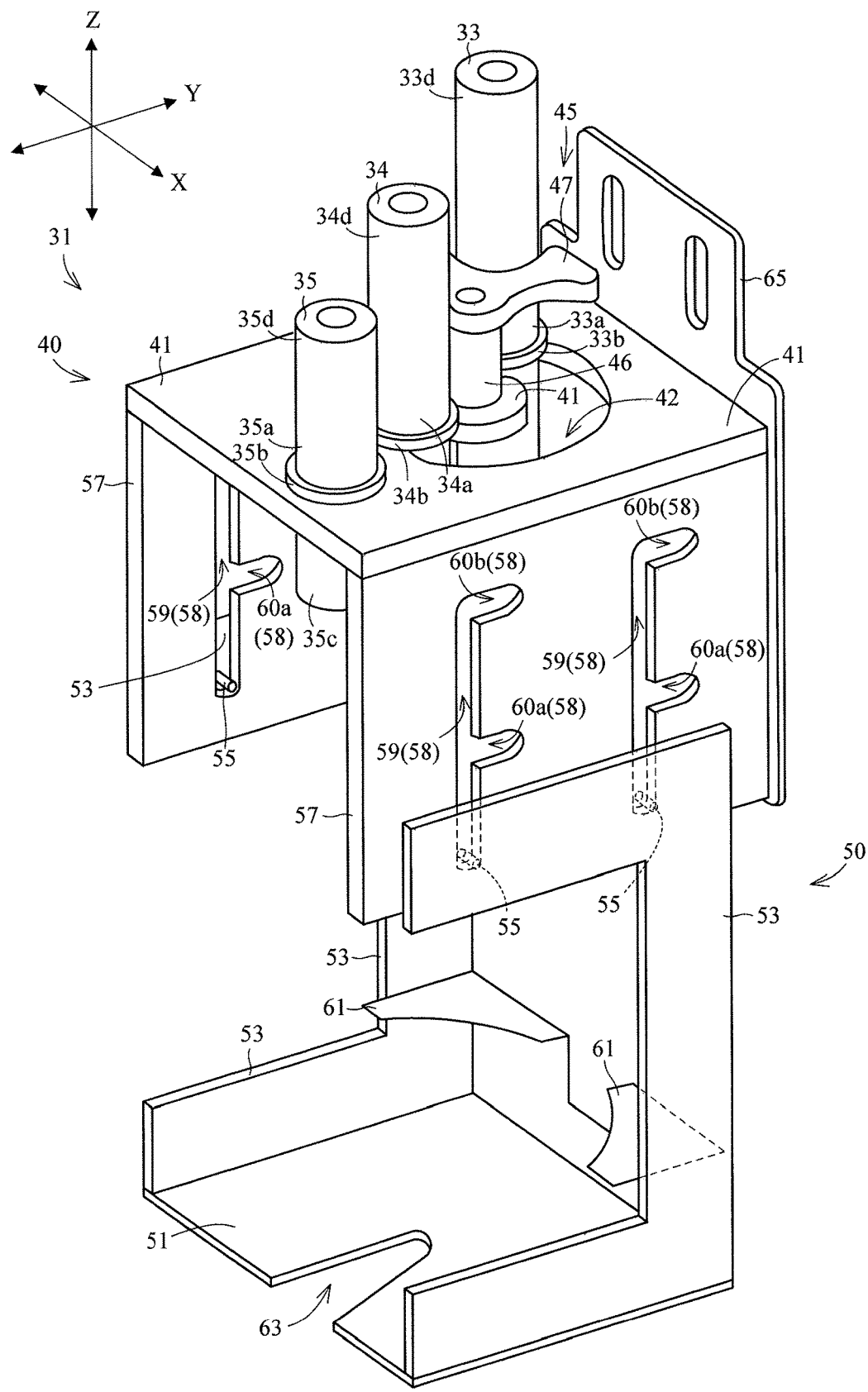
FIG. 3 is a perspective view of a filter coupling device.
Figure 4:
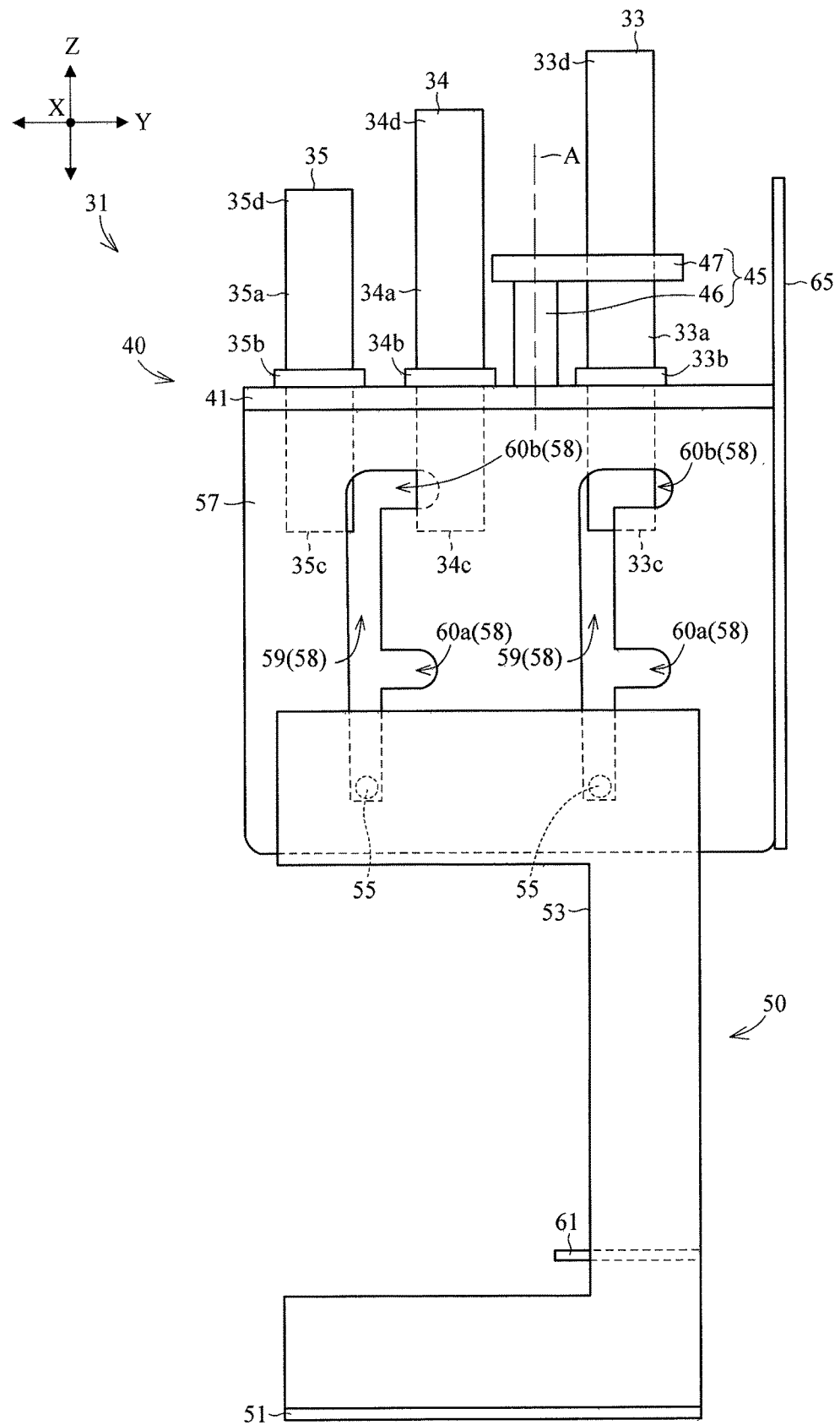
FIG. 4 is a side view of the filter coupling device.
Figure 5:
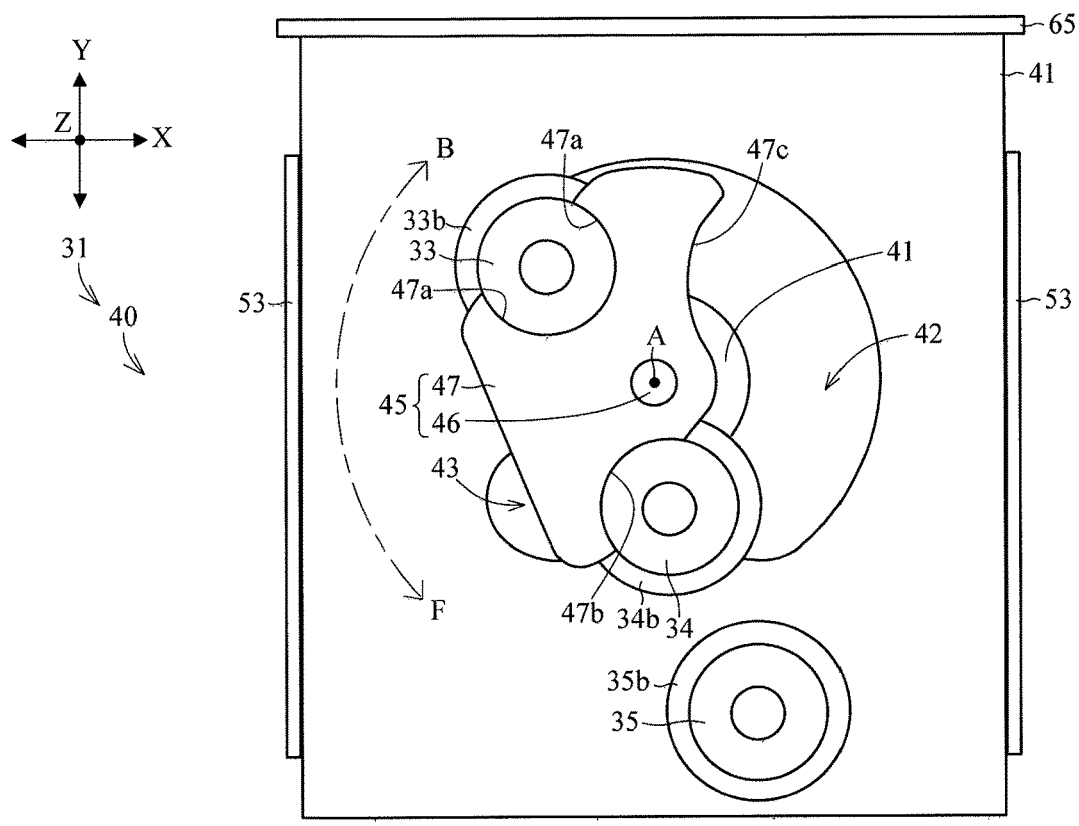
FIG. 5 is a plan view of the filter coupling device.

FIG. 3 is a perspective view of the filter coupling device 31. FIG. 4 is a side view of the filter coupling device 31. FIG. 5 is a plan view of the filter coupling device 31. In each figure, "X" and "Y" indicate horizontal directions perpendicular to each other, and "Z" indicates the vertical direction (also called the "up-down direction").

The joint members 33, 34 and 35 are shaped tubular, respectively. The filter coupling device 31 has an arrangement switcher 40 besides the joint members 33, 34 and 35. The arrangement switcher 40 switches between a plurality of arrangements of the joint members 33, 34 and 35.

Figure 6:
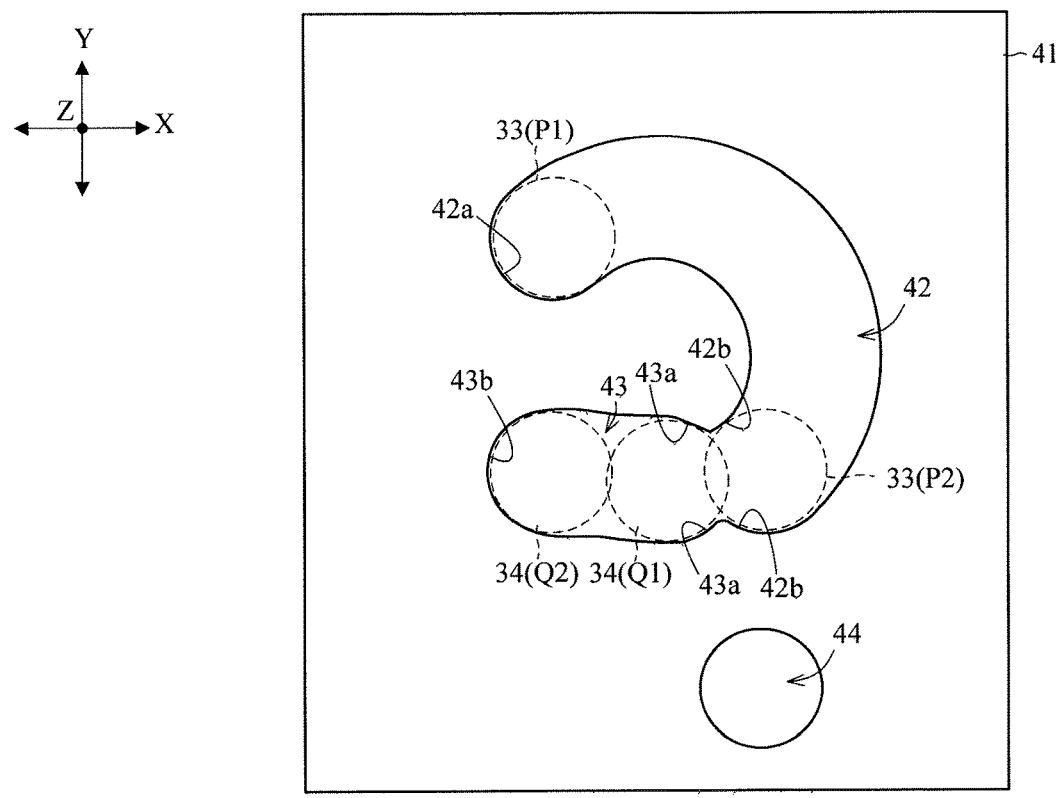
FIG. 6 is a plan view of a base plate, slots and a through-hole.

The arrangement switcher 40 includes a base plate 41 and slots 42 and 43 (see FIG. 6 for the slot 43). The base plate 41 is in form of a substantially horizontal plate. The slots 42 and 43 are formed in the base plate 41. The slots 42 and 43 penetrate the base plate 41 from an upper surface to a lower surface thereof.

The base plate 41 supports the joint members 33 and 34 against dropping off. The joint member 33 is disposed in the slot 42. The joint member 34 is disposed in the slot 43. Specifically, the joint members 33 and 34 are inserted in the slots 42 and 43, respectively. The joint members 33 and 34 have flange portions 33b and 34b protruding from outer circumferential surfaces 33a and 34a thereof, respectively. The flange portions 33b and 34b are larger than the width of slots 42 and 43, respectively. The flange portions 33b and 34b are in contact with the upper surface of the base plate 41. Consequently, the joint members 33 and 34 do not drop off downward from the base plate 41. The joint members 33 and 34 are placed in a vertical position on the base plate 41.

The slots 42 and 43 are long bores. The slot 42 guides the joint member 33. The slot 43 guides the joint member 34. The joint members 33 and 34 are horizontally movable along the slots 42 and 43.

The base plate 41 further holds the joint member 35 in a predetermined position. The joint member 35 is disposed in a through-hole 44 (see FIG. 6 which will be described hereinafter) formed in the base plate 41. More particularly, the joint member 35 is inserted in the through-hole 44. The joint member 35 is horizontally immovable relative to the base plate 41. The joint member 35 has a flange portion 35b protruding from an outer circumferential surface 35a thereof. The flange portion 35b is larger than the through-hole 44. The flange portion 35b is in contact with the upper surface of the base plate 41. Consequently, the joint member 35 does not drop off downward from the base plate 41. The joint member 35 is placed in a vertical position on the base plate 41.

Reference is made to FIG. 4. The joint members 33, 34 and 35 have lower ends 33c, 34c and 35c thereof located below the base plate 41. The upper ends 33d, 34d and 35d of the joint members 33, 34 and 35 are located above the base plate 41.

The base plate 41 is an example of the base portion in this invention. The base plate 41 acts as a holder for holding the joint member 35.

FIG. 6 is a plan view of the base plate 41. The position of joint member 33 where the joint member 33 contacts one end edge 42a of the slot 42 is regarded as "position P1". The position of joint member 33 where the joint member 33 contacts the other end edge 42b of the slot 42 is regarded as "position P2". The position of joint member 34 where the joint member 34 contacts one end edge 43a of the slot 43 is regarded as "position Q1". The position of joint member 34 where the joint member 34 contacts the other end edge 43b of the slot 43 is regarded as "position Q2". When the joint member 33 is located in position P1 and the joint member 34 in position Q1, the planar arrangement of joint members 33-35 is in agreement with the planar arrangement of connection openings 23a-25a of the first filter 21a. When the joint member 33 is located in position P2 and the joint member 34 in position Q2, the arrangement in plan view of the joint members 33-35 is in agreement with the arrangement in plan view of the connection openings 23b-25b of the second filter 21b.

In this specification, the arrangement of joint members 33-35 when the joint member 33 is in position P1 and the joint member 34 in position Q1 is called the "first arrangement". The arrangement of joint members 33-35 when the joint member 33 is in position P2 and the joint member 34 in position Q2 is called the "second arrangement". Then, position P1 is the right position of the joint member 33 in the first arrangement. Position P2 is the right position of the joint member 33 in the second arrangement. Position Q1 is the regular position of the joint member 34 in the first arrangement. Position Q2 is the regular position of the joint member 34 in the second arrangement.

The position of the joint member 35 held by the base plate 41 is the regular position of the joint member 35 in the first arrangement, and the regular position of the joint member 35 in the second arrangement.

The slots 42 and 43 are examples of the guide in this invention.

As described above, the joint members 33 and 34 change the positions between the first arrangement and second arrangement. On the other hand, the joint member 35 does not change the position between the first arrangement and second arrangement (it remains in the same position). Therefore, a distinction may be made by calling the former (the joint members 33 and 34 in this embodiment) "movable connection ports", and the latter (the joint member 35 in this embodiment) "fixed connection port".

The arrangement switcher 40 includes a moving unit 45 for moving the joint members 33 and 34 which are the movable connection ports. More particularly, the moving unit 45 moves the joint members 33 and 34 substantially horizontally.

The moving unit 45 has a shaft member 46 and a cam member 47. The shaft member 46 is attached to the base plate 41. The shaft member 46 has an axis A thereof extending in the vertical direction Z. The cam member 47 is supported by the shaft member 46. The cam member 47 is rotatable in a forward direction F and a backward direction B about the axis A (see FIG. 5). The cam member 47 is disposed above the base plate 41.

The cam member 47 has a contact portion 47a for contact with the joint member 33, and contact portions 47b and 47c for contact with the joint member 34. The contact portion 47a is approximately U-shaped. The contact portion 47a is in constant contact with the joint member 33 in a way to pinch the outer circumferential surface 33a of the joint member 33. The contact portion 47a pushes the joint member 33 in the forward direction F and backward direction B. The contact portion 47b can contact one side of the outer circumferential surface 34a of the joint member 34. The contact portion 47b pushes the joint member 34 only in the forward direction F. The contact portion 47c can contact the other side of the outer circumferential surface 34a of the joint member 34. The contact portion 47c pushes the joint member 34 only in the backward direction B.

Operation of the moving unit 45 for moving the joint members 33 and 34 will now be described.

FIGS. 7A-7F are plan views of the arrangement switcher 40 showing temporal variations in the motion of the cam member 47 and the positions of the joint members 33-35.

Figure 7A:
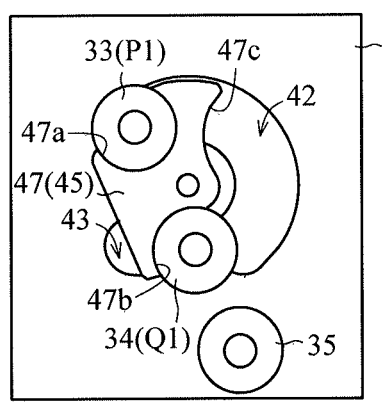
FIGS. 7A-7F are views illustrating temporal variations in the motion of a cam member and the positions of joint members.

Reference is made to FIG. 7A. When the cam member 47 is in a position shown in FIG. 7A, the joint members 33-35 are arranged in the first arrangement. The joint member 33 is in position P1, and in contact with one end edge 42a of the slot 42. The joint member 34 is in position Q1, and in contact with one end edge 43a of the slot 43

The contact portion 47a is in contact with the joint member 33. The contact portion 47a restricts shifting of the joint member 33 from position P1 (specifically, separation of the joint member 33 from the one end edge 42a of the slot 42). For example, the contact portion 47a prevents the joint member 33 moving horizontally along the slot 42. The contact portion 47b is in contact with the joint member 34. The contact portion 47b restricts shifting of the joint member 34 from position Q1. The contact portion 47c is out of contact with the joint member 34. The cam member 47 cannot further rotate in the forward direction F from the position shown in FIG. 7A.

Figure 7B:
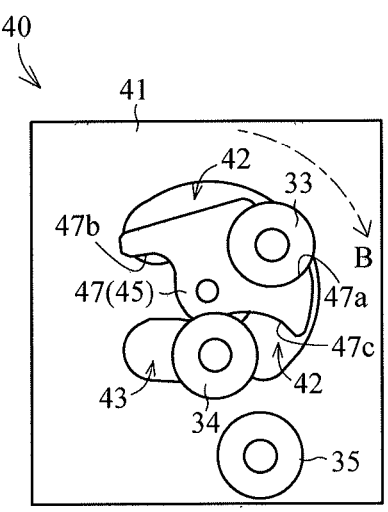

Reference is made to FIG. 7B. When the cam member 47 rotates in the backward direction B from the position shown in FIG. 7A, the contact portion 47a pushes the joint member 33 in the backward direction B. The joint member 33 moves along the slot 42. The contact portion 47b separates from the joint member 34. The contact portion 47c remains separated from the joint member 34. The joint member 34 does not move.

Figure 7F:
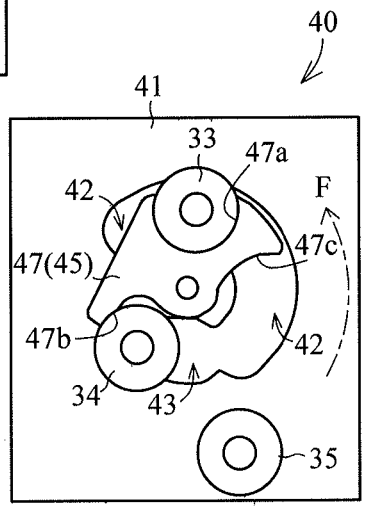
Figure 7C:
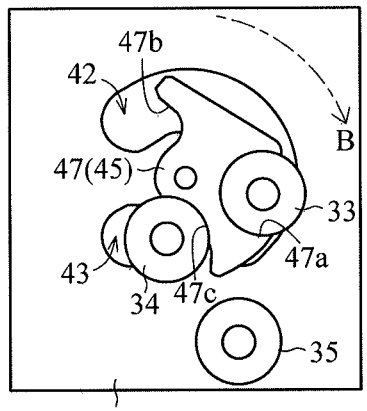

Reference is made to FIG. 7C. When the cam member 47 further rotates in the backward direction B, the contact portion 47a continues pushing the joint member 33 in the backward direction B. The contact portion 47c begins to contact the joint member 34, and begins to push the joint member 34 in the backward direction B. The joint member 34 begins to move along the slot 43. The contact portion 47b remains separated from the joint member 34.

Figure 7E:
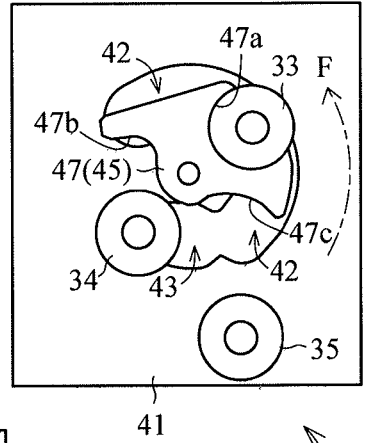
Figure 7D:
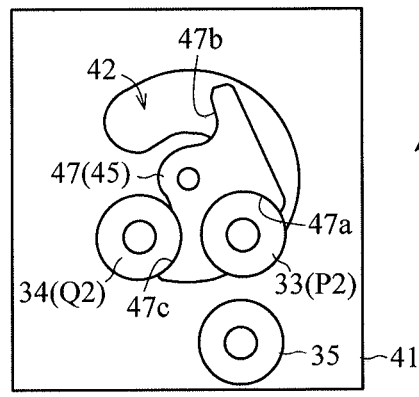

Reference is made to FIG. 7D. When the cam member 47 further rotates in the backward direction B, the joint members 33 and 34 reach positions P2 and Q2, respectively. That is, the joint members 33 and 34 contact the other end edges 42b and 43b of the slots 42 and 43. Consequently, the motion of the joint members 33 and 34 stops and the rotation of the cam member 47 also stops. The cam member 47 cannot rotate any more in the backward direction B. The joint members 33 and 34 stand still in the positions P2 and Q2, respectively. The arrangement of the joint member 33-35 changes to the second arrangement.

The contact portion 47a is in contact with the joint member 33. The contact portion 47a restricts shifting of the joint member 33 from position P2. The contact portion 47c is in contact with the joint member 34. The contact portion 47c restricts shifting of the joint member 34 from position Q2. The contact portion 47b remains separated from the joint member 34.

Reference is made to FIG. 7E. When the cam member 47 rotates in the forward direction F from the position shown in FIG. 7D, the contact portion 47a pushes the joint member 33 in the forward direction F. The joint member 33 moves along the slot 42. The contact portion 47c separates from the joint member 34. The contact portion 47b remains separated from the joint member 34. The joint member 34 does not move.

Reference is made to FIG. 7F. When the cam member 47 further rotates in the forward direction F, the contact portion 47a continues pushing the joint member 33 in the forward direction F. The contact portion 47b begins to contact the joint member 34, and begins to push the joint member 34 in the forward direction F. The joint member 34 begins to move along the slot 43. The contact portion 47c remains separated from the joint member 34.

Reference is made to FIG. 7A. When the cam member 47 further rotates in the forward direction F, the joint members 33 and 34 reach positions P1 and Q1, respectively. That is, the joint members 33 and 34 contact the one end edges 42a and 43a of the slots 42 and 43. Consequently, the motion of the joint members 33 and 34 stops and the rotation of the cam member 47 also stops. The cam member 47 cannot rotate any more in the forward direction F. The joint members 33 and 34 stand still in positions P1 and Q1, respectively, and the arrangement of joint members 33-35 changes to the first arrangement.

Reference is made to FIGS. 3 and 4. The filter coupling device 31 includes a filter support 50 for supporting the filter 21. The filter support 50 has a support plate 51 and a pair of arm portions 53.

The support plate 51 has a substantially horizontal plate shape. The support plate 51 receives the filter 21 placed on an upper surface thereof.

One of the arm portions 53 is fixedly connected to a right side of the support plate 51 to extend upward from the support plate 51. The other arm portion 53 is fixedly connected to a left side of the support plate 51 to extend upward from the support plate 51.

The filter coupling device 31 includes pin members 55. The pin members 55 are fixed to each arm portion 53. The pin members 55 project horizontally (e.g. X-direction) from each arm portion 53.

The filter coupling device 31 includes a pair of side wall portions 57. One of the side wall portions 57 is fixedly connected to a right side of the base plate 41 to extend downward from the base plate 41. The other side wall portion 57 is fixedly connected to a left side of the base plate 41 to extend downward from the base plate 41.

The filter coupling device 31 has grooves 58. The grooves 58 are formed in each side wall portion 57. The pin members 55 are engaged in the grooves 58. The pin members 55 are slidable along the grooves 58. That is, the grooves 58 guide the pin members 55.

Each groove 58 includes a groove portion 59 for up-and-down movement, a groove portion 60a for first locking, and a groove portion 60b for second locking. The groove portion 59 for up-and-down movement extends in the vertical direction Z. The groove portion 60a for first locking and the groove portion 60b for second locking each extend substantially horizontally (e.g. in Y-direction). The groove portion 60b for second locking is located in a position higher than the groove portion 60a for first locking. The groove portion 59 for up-and-down movement is connected to both the groove portion 60a for first locking and the groove portion 60b for second locking.

With the pin members 55 sliding along the groove portions 59 for up-and-down movement, the filter support plate 51 and arm portions 53 move together in the vertical direction Z. That is, the filter support 50 moves up and down relative to the base plate 41 and side wall portions 57.

With the pin members 55 sliding along the groove portions 60a and 60b for first and second locking, the filter support 50 moves substantially horizontally (e.g. in Y-direction) relative to the base plate 41 and side wall portions 57.

However, when the pin members 55 are in the groove portions 60a and 60b for first and second locking, the pin members 55 cannot move vertically. The filter support 50 is prohibited from moving vertically. In other words, the filter support 50 can be maintained in a constant height position.

The groove portions 60a for first locking and the groove portions 60b for second locking are at heights different from each other. The groove portions 60a for first locking and the groove portions 60b for second locking can therefore maintain the filter support 50 in different height positions.

Reference is made to FIGS. 8A and 8B. FIGS. 8A and 8B are views illustrating height positions of the filter support 50. In this specification, for expediency, height positions of the support plate 51 are regarded as the height positions of the filter support 50.

The groove portions 60a for first locking maintain the filter support 50 in a first height position ha. Specifically, when the filter support 50 is in the first height position ha, the groove portions 60a for first locking prohibit the filter support 50 from moving vertically.

The groove portions 60b for second locking maintain the filter support 50 in a second height position hb (ha≠hb). Specifically, when the filter support 50 is in the second height position hb, the groove portions 60b for second locking prohibit the filter support 50 from moving vertically.

When the filter support 50 is in the first height position ha, the connection openings 23a-25a of the first filter 21a supported by the filter support 50 are connected to the joint members 33-35. That is, the first filter 21a is connected to the filter coupling device 31. When the filter support 50 is in the second height position hb, the connection openings 23b-25b of the second filter 21b supported by the filter support 50 are connected to the joint members 33-35.

The side wall portions 57 are an example of the base portion in this invention. That is, the base plate 41 and side wall portions 57 constitute the base portion. The pin members 55 and the groove portions 59 for up-and-down movement are an example of the up-and-down movement portion in this invention. The groove portions 60a and 60b for locking are examples of the up-and-down movement locking portions in this invention, respectively.

Reference is made to FIGS. 3 and 4. The filter coupling device 31 includes receivers 61 for positioning the filter 21 (especially the first filter 21a). Specifically, the receivers 61 determine a position of the filter 21 relative to the filter support 50. The receivers 61 are attached to the arm portions 53. When the first filter 21a is placed on the support plate 51, the receivers 61 contact the outer circumferential surface of the housing 26a to set the first filter 21a to an appropriate position. When the first filter 21a is in the appropriate position, the connection openings 23a-25a of the first filter 21a are located below the joint members 33-35 in the first arrangement, respectively (that is, the connection openings 23*a*-25*a* of the first filter 21*a* are opposed in the vertical direction Z to the joint members 33-35 in the first arrangement, respectively).

Reference is made to FIG. 3. The filter coupling device 31 includes a cutout 63 for positioning the filter 21 (especially the second filter 21*b*). Specifically, the cutout 63 determines a position of the filter 21 relative to the filter support 50. The cutout 63 is formed in the support plate 51. When the second filter 21*b* is placed on the support plate 51, the cutout 63 contacts the bottom of the housing 26*b* to set the second filter 21*b* to an appropriate position. Note that the second filter 21*b* has a lug 27*b* projecting downward from the bottom of the housing 26*b* (see FIGS. 10A through 10C to be described hereinafter). The cutout 63 contacts the lug 27*b*. When the second filter 21*b* is in the appropriate position, the connection openings 23*b*-25*b* of the second filter 21*b* are opposed in the vertical direction Z to the joint members 33-35 in the second arrangement.

The filter coupling device 31 includes a mounting bracket 65. The mounting bracket 65 is fixedly connected to a rear portion of the base plate 41. The mounting bracket 65 is fixed to an installation location (e.g. a wall surface) of the filter coupling device 31.

<Operations for Attaching and Detaching Filters 21 to/from Filter Coupling Device 31>

Next, operations for attaching and detaching the filters 21 to/from the filter coupling device 31 will be described. Specifically, operation for connecting the first filter 21*a* to the filter coupling device 31 and operation for removing the first filter 21*a* from the filter coupling device 31 will be described. Then, operation for connecting the second filter 21*b* to the filter coupling device 31 and operation for removing the second filter 21*b* from the filter coupling device 31 will be described. The filter coupling device 31 is manually operated by the user. The user manually moves the moving unit 45, filter support 50 and so on, for example.

<Attaching First Filter 21*a*>

Figure 9A:
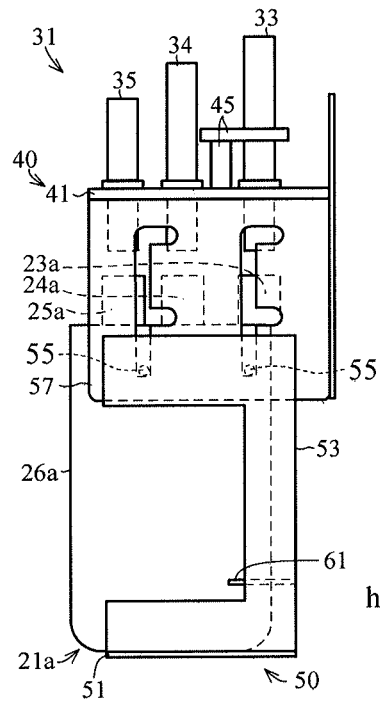
FIGS. 9A, 9B and 9C are views illustrating procedures for attaching and detaching the first filter to/from the filter coupling device.
Figure 9B:
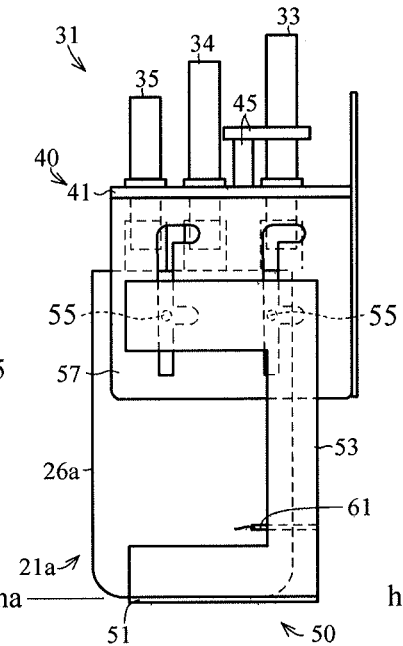
Figure 9C:
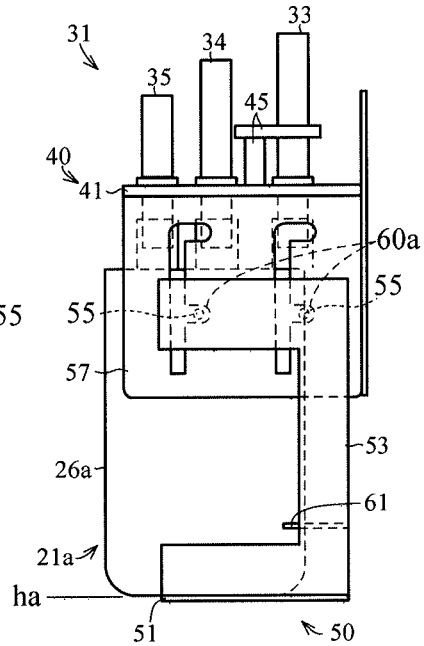

FIGS. 9A, 9B, and 9C are views illustrating procedures for attaching and detaching the first filter 21*a* to/from the filter coupling device 31.

First, the moving unit 45 (cam member 47) is operated to switch the arrangement of the joint members 33-35 to the first arrangement. The pin members 55 are slid along the groove portions 59 for up-and-down movement to lower the filter support 50 to a sufficiently low position.

Next, the first filter 21*a* is placed on the support plate 51. The filter support 50 supports the first filter 21*a* (see FIG. 9A). The first filter 21*a* is pushed horizontally inward to a position where the first filter 21*a* contacts the receivers 61. Consequently, the filter 21*a* is set to the right position. The connection openings 23*a*, 24*a* and 25*a* of the first filter 21*a* are located directly under the joint members 33, 34 and 35. The connection openings 23*a*-25*a* are opposed to the joint members 33-35.

Then, the filter support 50 is raised (that is, the pin members 55 are raised along the groove portions 59 for up-and-down movement). Consequently, the first filter 21*a* ascends close to the base plate 41. The connection openings 23*a*-25*a* approach the joint members 33-35 as opposed to the joint members 33-35.

When the filter support 50 is raised to the first height position ha, the connection openings 23*a*-25*a* of the first filter 21*a* connect to the joint members 33-35, respectively (see FIG. 9B). Specifically, the lower ends 33*c*-35*c* of the joint members 33-35 are fitted inside the connection openings 23*a*-25*a*. This connects the filter coupling device 31 with the first filter 21*a*.

Then, the filter support 50 is pushed horizontally inward to move the pin members 55 into the groove portions 60*a* for first locking (see FIG. 9C). At this time the first filter 21*a* slides relative to the support plate 51 and does not move horizontally. When the pin members 55 are located in the groove portions 60*a* for first locking, the filter support 50 is prohibited from vertical movement, and is maintained in the height position ha. Consequently, the first filter 21*a* is prevented from moving away from the base plate 41 (joint members 33-35) and dropping downward from the base plate 41 (joint members 33-35).

The first filter 21*a* is used in the state shown in FIG. 9C. That is, the treating liquid is filtered by the first filter 21*a*.

<Operation for Removing First Filter 21*a* from Filter Coupling Device 31>

The filter support 50 is pulled horizontally toward the user. This moves the pin members 55 from the groove portions 60*a* for first locking to the groove portions 59 for up-and-down movement (see FIG. 9B).

The filter support 50 is lowered (that is, the pin members 55 are lowered along the groove portions 59 for up-and-down movement). The first filter 21*a* moves away from the base plate 41 (joint members 33-35) while remaining opposed to the base plate 41 (joint members 33-35). The connection openings 23*a*-25*a* of the first filter 21*a* separate from the joint members 33-35, respectively. That is, the first filter 21*a* uncouples from the filter coupling device 31.

After lowering the filter support 50 to a sufficiently low position as shown in FIG. 9A, the first filter 21*a* is removed from the filter support 50.

<Operation for Coupling Second Filter 21*b* to Filter Coupling Device 31>

Figure 10A:
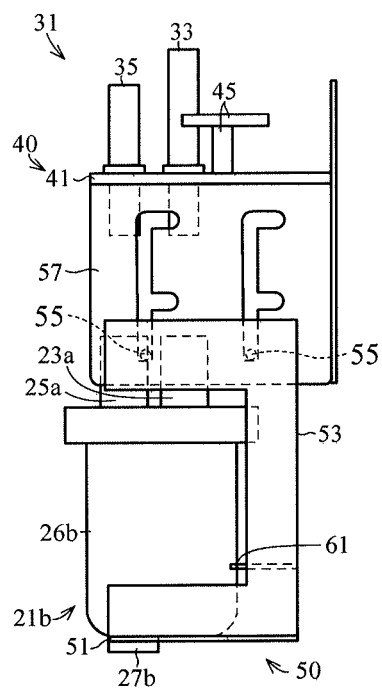
FIGS. 10A, 10B, and 10C are views illustrating procedures for attaching and detaching the second filter to/from the filter coupling device.
Figure 10B:
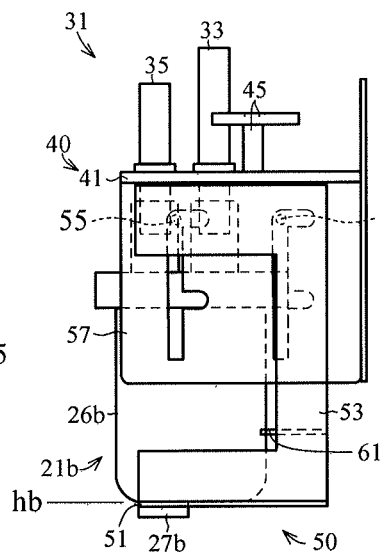
Figure 10C:
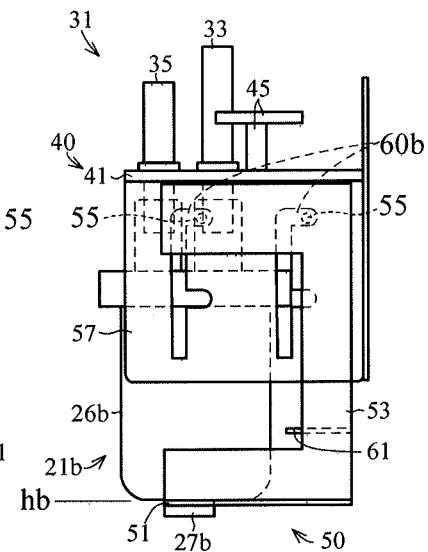

FIGS. 10A, 10B, and 10C are views illustrating procedures for attaching and detaching the second filter 21*b* to/from the filter coupling device 31.

The arrangement of the joint members 33-35 is switched to the second arrangement, and the filter support 50 is lowered to a sufficiently low position.

The second filter 21*b* is placed on the support plate 51. The filter support 50 supports the second filter 21*b* (see FIG. 10A). The second filter 21*b* is pushed horizontally inward to insert the lug 27*b* of the second filter 21*b* into the cutout 63. The second filter 21*b* is moved horizontally inward until the lug 27*b* contacts the cutout 63 (support plate 51). Consequently, the second filter 21*b* is set to the right position. The connection openings 23*b*, 24*b* and 25*b* of the second filter 21*b* are located directly under the joint members 33, 34 and 35. The connection openings 23*b*-25*b* are opposed to the joint members 33-35.

The filter support 50 is raised to the height hb (FIG. 10B). This connects the filter coupling device 31 with the second filter 21*b*.

The filter support 50 is pushed horizontally inward to move the pin members 55 into the groove portions 60*b* for second locking (see FIG. 10C). At this time the second filter 21*b* slides relative to the support plate 51 and does not move horizontally. Consequently, the filter support 50 is prohibited from vertical movement, and is maintained in the height position hb. The second filter 21*b* is used in the state shown in FIG. 10C.

<Operation for Removing Second Filter 21*b* from Filter Coupling Device 31>

The filter support 50 is pulled horizontally toward the user. This moves the pin members 55 from the groove portions 60*b* for second locking to the groove portions 59 for up-and-down movement (see FIG. 10B).

The filter support 50 is lowered. Consequently, the second filter 21b separates from the filter coupling device 31. After lowering the filter support 50 to a sufficiently low position as shown in FIG. 10A, the second filter 21b is removed from the filter support 50.

<Advantageous Effects>

Since the filter coupling device 31 in Embodiment 1 includes the arrangement switcher 40 as described above, the arrangement of the plurality of joint members 33-35 can be switched between the first arrangement and second arrangement. The first arrangement and second arrangement are determined beforehand. The first arrangement is set to suit the first filter 21a. Specifically, when the joint members 33-35 are in the first arrangement, the respective joint members 33-35 can connect to the connection openings 23a-25a of the first filter 21a. The second arrangement is set to suit the second filter 21b. Specifically, when the joint members 33-35 are in the second arrangement, the respective joint members 33-35 can connect to the connection openings 23b-25b of the second filter 21b. Therefore, after the arrangement switcher 40 switches the arrangement of the joint members 33-35 to the first arrangement, the filter coupling device 31 can conveniently be connected to the first filter 21a. After the arrangement switcher 40 switches the arrangement of the joint members 33-35 to the second arrangement, the filter coupling device 31 can conveniently be connected to the second filter 21b. Thus, the filter coupling device 31 can be connected to both the first and second filters 21a and 21b having different arrangements of the connection openings 23-25. Therefore, change can easily be made between the filters 21a and 21b having different arrangements of the connection openings 23-25, without changing the filter coupling device 31.

The arrangement switcher 40, with the slot 42, can guide the joint member 33 between position P1 in the first arrangement and position P2 in the second arrangement. Similarly, the arrangement switcher 40, with the slot 43, can guide the joint member 34 between position Q1 in the first arrangement and position Q2 in the second arrangement. Therefore, the arrangement of the joint members 33-35 can be switched smoothly between the first arrangement and second arrangement.

One end edge 42a of the slot 42 provides position P1 in the first arrangement of the joint member 33, and the other end edge 42b of the slot 42 provides position P2 in the second arrangement of the joint member 33. Therefore, the slot 42 can easily guide the joint member 33 to positions P1 and P2. Similarly, one end edge 43a of the slot 43 provides position Q1 in the first arrangement of the joint member 34, and the other end edge 43b of the slot 43 provides position Q2 in the second arrangement of the joint member 34. Therefore, the slot 43 can easily guide the joint member 34 to positions Q1 and Q2.

The arrangement switcher 40, with the moving unit 45, can move the joint members 33 and 34 easily. Specifically, the joint member 33 can be moved between position P1 in the first arrangement and position P2 in the second arrangement. The joint member 34 can be moved between position Q1 in the first arrangement and position Q2 in the second arrangement. Therefore, the arrangement of the joint members 33-35 can easily be switched between the first arrangement and second arrangement.

The moving unit 45, with the cam member 47, can move the joint members 33 and 34 conveniently. Specifically, since the cam member 47 has the contact portion 47a, the joint member 33 can be moved conveniently. Since the cam member 47 has the contact portions 47b and 47c, the joint member 34 can be moved conveniently.

Since one cam member 47 moves the two joint members 33 and 34, the number of cam members 47 provided for the moving unit 45 can be reduced, and the construction of the moving unit 45 can be simplified.

The contact portion 47a is in contact with the joint member 33 both when the joint member 33 is in position P1 and when it is in position P2 (see FIGS. 7A and 7B). Therefore, the contact portion 47a can detain the joint member 33 conveniently in positions P1 and P2. In other words, the contact portion 47a can hold the joint member 33 conveniently in positions P1 and P2.

The contact portion 47b is in contact with the joint member 34 when the joint member 34 is in position Q1. Therefore, the contact portion 47b can detain the joint member 34 conveniently in position Q1.

The contact portion 47c is in contact with the joint member 34 when the joint member 34 is in position Q2. Therefore, the contact portion 47c can detain the joint member 34 conveniently in position Q2.

The filter coupling device 31, with the filter support 50, can support the filters 21 conveniently.

The filter coupling device 31, with the pin members 55 and the groove portions 59 for up-and-down movement, can move the filter support 50 up and down smoothly.

The filter support 50 is connected to the side wall portions 57 and base plate 41 (base portion) through the pin members 55 and the groove portions 59 for up-and-down movement. Therefore, the filter support 50 can move up and down relative to the base portion. The base portion holds the joint members 33-35. Therefore, the filter support 50 can move up and down relative to the joint members 33-35.

The filter coupling device 31, with the groove portions 60a for first locking and the groove portions 60b for second locking, can prohibit up-and-down movement of the filter support 50 conveniently. Consequently, the height positions of the filter support 50 can be maintained constant. Therefore, for example, there is no possibility of the filters 21 coming off or dropping from the filter coupling device 31 while the filters 21 are in use.

Especially, the groove portions 60a for first locking maintain the filter support 50 in the first height position ha. When the filter support 50 is in the first height position ha, the filter coupling device 31 can be connected with the first filter 21a. Therefore, the groove portions 60a for first locking can reliably maintain the state of the filter coupling device 31 connected with the first filter 21a. The groove portions 60b for second locking maintain the filter support 50 in the second height position hb. When the filter support 50 is in the second height position hb, the filter coupling device 31 can be connected with the second filter 21b. Therefore, the groove portions 60b for second locking can reliably maintain the state of the filter coupling device 31 connected with the second filter 21b. Thus, the filter coupling device 31 can keep appropriate the connected states of both filters 21a and 21b different in height H.

The filter coupling device 31 can be connected with filters 21 different in shape from both the first filter 21a and second filter 21b. For example, a "third filter 21" may have connection openings arranged like the connection openings 23a-25a of the first filter 21a, and the same height Hb as the second filter 21b. The filter coupling device 31 can conveniently be connected also with the third filter 21. For example, a "fourth filter 21" may have connection openings arranged like the connection openings 23b-25b of the second filter 21b, and the same height Ha as the first filter 21a. The filter coupling device 31 can conveniently be connected also with the fourth filter 21.

The substrate treating apparatus 1 in this embodiment, with the filter coupling device 31, can easily change filters 21 between two or more types of filters 21a and 21b different in arrangement of the connection openings 23-25. Therefore, according to types of wafer W, types of treating liquid, or types of treatment, the filters 21 can easily be selected or changed, and the treating liquid can be filtered more appropriately. Therefore, the treatment quality of wafers W can be further improved.

[Embodiment 2]

Embodiment 2 of this invention will be described hereinafter with reference to the drawings. The substrate treating apparatus 1 in Embodiment 2 is the same as in Embodiment 1, and the outline of the substrate treating apparatus 1 will not be described again. The filter coupling device 31 in Embodiment 2 has an arrangement switcher 70 different from the arrangement switcher 40 in Embodiment 1. Therefore, the construction of the arrangement switcher 70 will be described hereinafter. Components identical to those of Embodiment 1 are shown with the same signs, and will not particularly be described.

Figure 11:
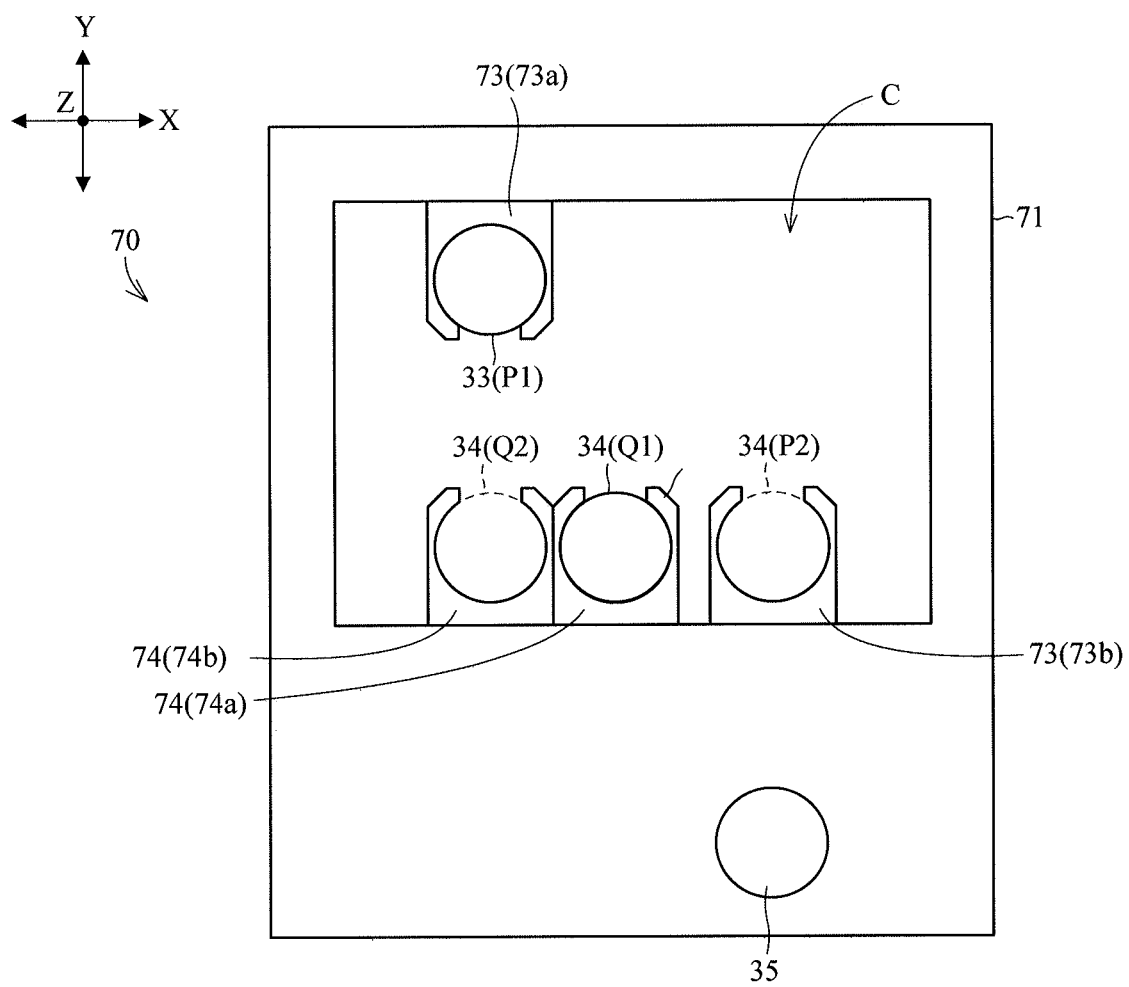
FIG. 11 is a plan view of an arrangement switcher according to Embodiment 2.

FIG. 11 is a plan view of the arrangement switcher 70. The arrangement switcher 70 has a base plate 71. The base plate 71 holds the joint member 35. The base plate 71 has an opening C sufficiently large compared with the joint members 33 and 34.

The arrangement switcher 70 has joint holders (also called "tube holders") 73 and 74. The joint holders 73 and 74 are attached to the base plate 71.

The joint holders 73 hold the joint member 33. The joint holders 73 include a joint holder 73a for holding the joint member 33 in position P1, and a joint holder 73b for holding the joint member 33 in position P2. The joint holders 73a and 73b have elastically deformable openings, respectively. The joint holders 73a and 73b grip the joint member 33 pushed into the openings of the joint holders 73a and 73b. When the joint member 33 held in the joint holders 73a and 73b is pulled, the joint member 33 will be removed from the joint holders 73a and 73b.

The joint holders 74 hold the joint member 34. The joint holders 74 include a joint holder 74a for holding the joint member 34 in position Q1, and a joint holder 74b for holding the joint member 33 in position Q2. The joint holders 74a and 74b have the same construction as the joint holders 73a and 73b. Therefore, the joint member 34 can easily be moved into and out of the joint holders 74.

The joint holders 73 and 74 are an example of the holders in this invention. The base plate 71 functions as a holder for holding the joint member 35.

When the joint member 33 is placed in the joint holder 73a and the joint member 34 in the joint holder 74a, the arrangement of joint members 33-35 is the first arrangement.

When switching the arrangement of joint members 33-35 from the first arrangement to the second arrangement, the joint member 33 is removed from the joint holder 73a and placed in the joint holder 73b, and the joint member 34 is removed from the joint holder 74a and placed in the joint holder 74b. Consequently, the arrangement of joint members 33-35 switches to the second arrangement.

Thus, the filter coupling device 31 in Embodiment 2, with the arrangement switcher 70, provides an effect similar to Embodiment 1. That is, the filter coupling device 31 can conveniently couple each of the filters 21a and 21b having the different arrangements of connection openings 23-25.

The arrangement switcher 70, with the joint holders 73, can hold the joint member 33 in the predetermined positions P1 and P2. The arrangement switcher 70, with the joint holders 74, can hold the joint member 34 in the predetermined positions Q1 and Q2. The arrangement switcher 70 can therefore keep the arrangement of joint members 33-35 conveniently in the first arrangement, and keep the arrangement of joint members 33-35 conveniently in the second arrangement.

The joint holders 73a, 73b, 74a and 74b hold the joint members 33 and 34 by elastically deformation. Therefore, the joint members 33 and 34 can easily be moved into and out of the joint holders 73a, 73b, 74a and 74b.

[Embodiment 3]

Embodiment 3 of this invention will be described hereinafter with reference to the drawings.

The substrate treating apparatus 1 in Embodiment 3 is the same as in Embodiment 1, and the outline of the substrate treating apparatus 1 will not be described again. The filter coupling device 31 in Embodiment 3 has an arrangement switcher 80 different from the arrangement switcher 40 in Embodiment 1. Therefore, the construction of the arrangement switcher 80 will be described hereinafter. Components identical to those of Embodiment 1 are shown with the same signs, and will not particularly be described.

Figure 12:
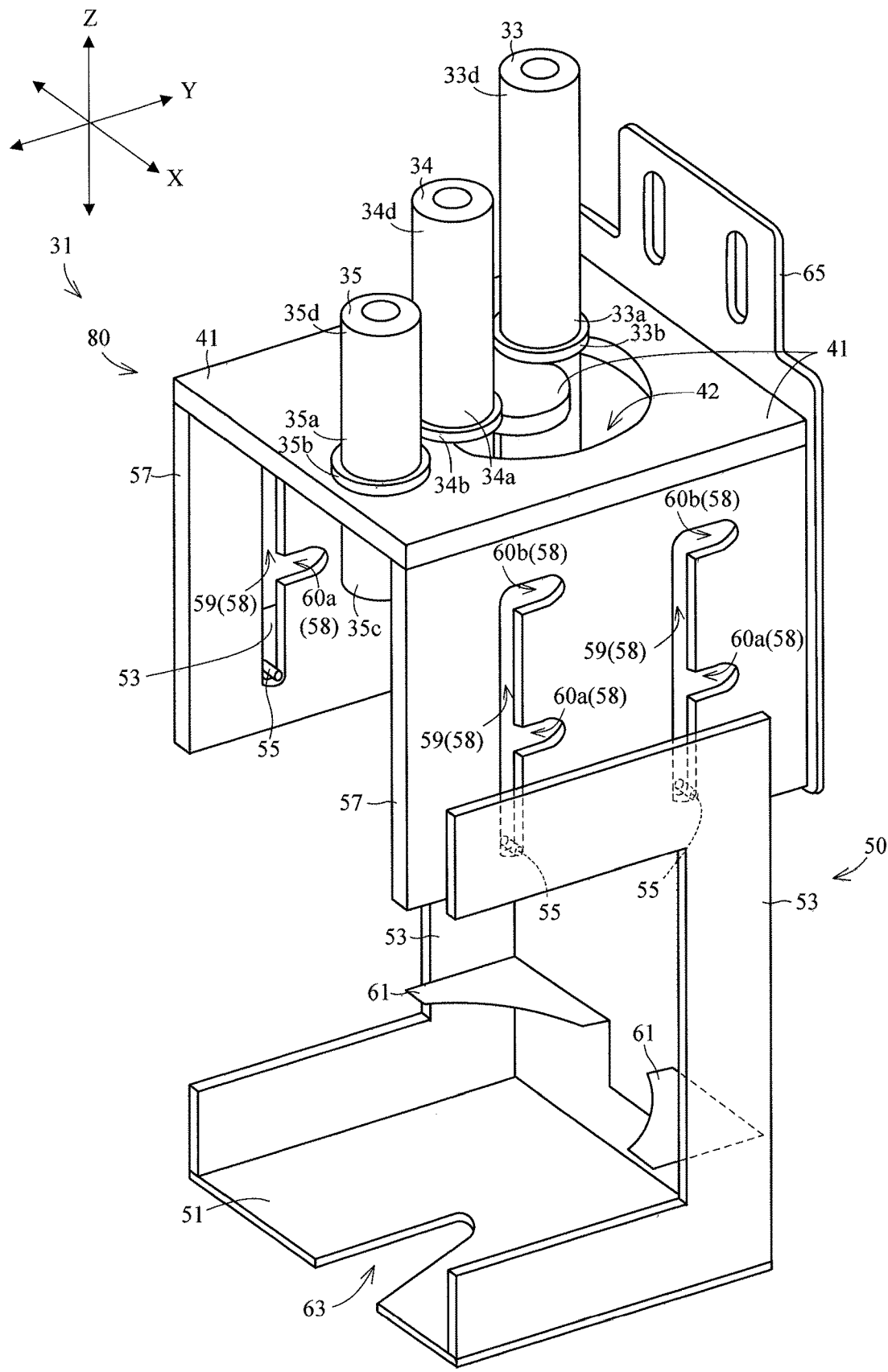
FIG. 12 is a perspective view of a filter coupling device according to Embodiment 3.

FIG. 12 is a plan view of the filter coupling device 80. The arrangement switcher 80 corresponds to the arrangement switcher 40 from which the moving unit 45 is omitted. That is, the arrangement switcher 80 has the base plate 71 and slots 42 and 43.

The user manually moves the joint members 33 and 34. Specifically, when the user moves the joint member 33 along the slot 42 to position P1 and the joint member 34 along the slot 43 to position Q1, the arrangement of joint members 33-35 switches to the first arrangement.

When switching the arrangement of joint members 33-35 from the first arrangement to the second arrangement, the user moves the joint member 33 from position P1 to position P2, and the joint member 34 from position Q1 to position Q2. Consequently, the arrangement of joint members 33-35 switches to the second arrangement.

Thus, the filter coupling device 31 in Embodiment 3, with the arrangement switcher 80, provides an effect similar to Embodiment 1. That is, the filter coupling device 31 can conveniently couple each of the filters 21a and 21b having the different arrangements of connection openings 23-25.

The arrangement switcher 80, with the slots 42 and 43, can smoothly switch the arrangement of joint members 33-35 between the first arrangement and second arrangement. The slot 42 can easily guide the joint member 33 to positions P1 and P2, and the slot 43 can easily guide the joint member 34 to positions Q1 and Q2.

[Embodiment 4]

Embodiment 4 of this invention will be described hereinafter with reference to the drawings. The substrate treating apparatus 1 in Embodiment 4 is the same as in Embodiment 1, and the outline of the substrate treating apparatus 1 will not be described again. The filter coupling device 31 in Embodiment 4 has an arrangement switcher 82 different from the arrangement switcher 40 in Embodiment 1. Therefore, the construction of the arrangement switcher 82 will be described hereinafter.

Figure 13:
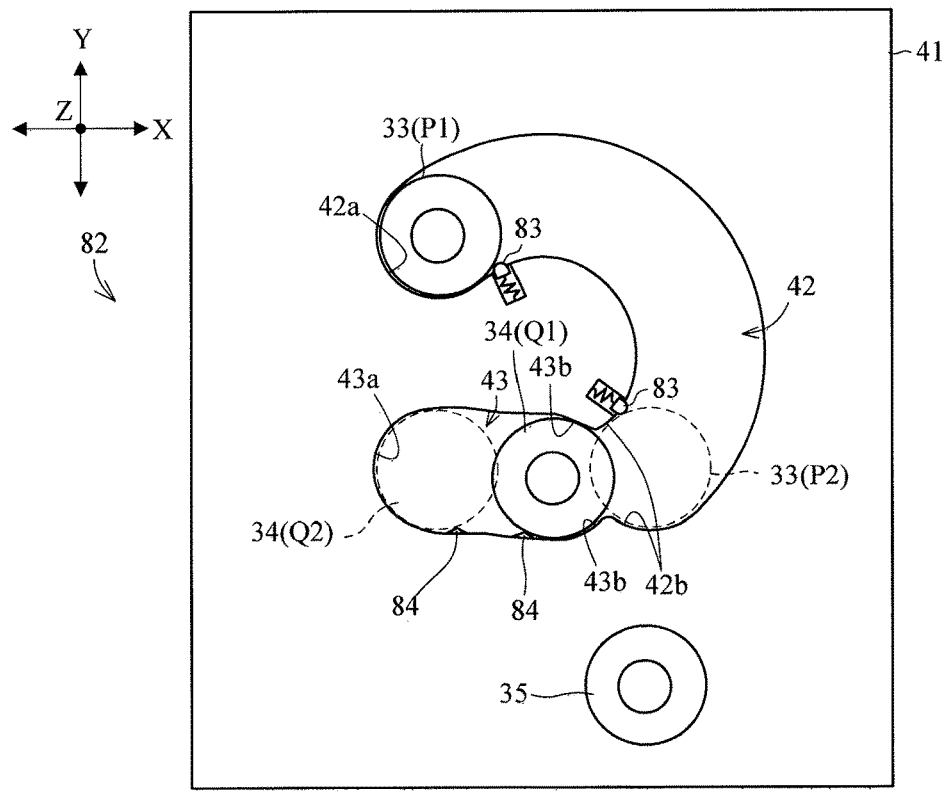
FIG. 13 is a plan view of an arrangement switcher according to Embodiment 4.

FIG. 13 is a plan view of the arrangement switcher 82. The arrangement switcher 82 corresponds to the arrangement switcher 80 with first stoppers 83 and second stoppers 84 added thereto. That is, the arrangement switcher 82 includes the base plate 41, slots 42 and 43, first stoppers 83 and second stoppers 84.

The first stoppers 83 easily stop the joint member 33 in predetermined positions (e.g. positions P1 and P2). Specifically, the first stoppers 83 are provided movable into and out of inside walls of the slot 42. The first stoppers 83 are in the form of resilient elements (springs) or the like. When a force acting on the joint member 33 is less than a certain level, the first stoppers 83 project into the slot 42 from the inside walls of the slot 42 to prevent the joint member 33 from passing through the positions of the first stoppers 83. When the force acting on the joint member 33 is equal to or greater than the certain level, the joint member 33 pushes the first stoppers 83 into the inside wall of the slot 42, and passes through the positions of the first stoppers 83. After the joint member 33 passes through the positions of the first stoppers 83, the first stoppers 83 project again into the slot 42 from the inside walls of the slot 42 under the restoring force of the resilient elements. Here, the force acting on the joint member 33 is a force for moving the joint member 33 along the slot 42. Thus, once the joint member 33 settles in the position P1 or P2, the first stopper 83 can easily stop the joint member 33 in position P1 or P2 until the first stopper 83 is depressed again.

The second stoppers 84 easily stop the joint member 34 in predetermined positions (e.g. positions Q1 and Q2). Specifically, the second stoppers 84 are formed to protrude from inside walls of the slot 43. Once the joint member 34 rides over the second stoppers 84 and gets settled in positions Q1 and Q2, the joint member 34 is detained in positions Q1 and Q2 until the joint member 34 rides over the second stoppers 84 again.

The first stoppers 83 and second stoppers 84 are examples of the stoppers in this invention.

Thus, the filter coupling device 31 in Embodiment 4, with the arrangement switcher 82, provides an effect similar to Embodiment 1. That is, the filter coupling device 31 can conveniently couple each of the filters 21a and 21b having the different arrangements of connection openings 23-25.

The arrangement switcher 82, with the first stoppers 83, can hold the joint member 33 in positions P1 and P2. Therefore, the joint member 33 can be prevented conveniently from shifting from positions P1 and P2. Similarly, the arrangement switcher 82, with the second stoppers 84, can hold the joint member 34 in positions Q1 and Q2. Therefore, the joint member 34 can be prevented conveniently from shifting from positions Q1 and Q2. As a result, the arrangement of joint members 33-35 can be maintained as each of the first arrangement and second arrangement.

[Embodiment 5]

Embodiment 5 of this invention will be described hereinafter with reference to the drawings. The substrate treating apparatus 1 in Embodiment 5 is the same as in Embodiment 1, and the outline of the substrate treating apparatus 1 will not be described again. The filter coupling device 31 in Embodiment 5 has an arrangement switcher 85 different from the arrangement switcher 40 in Embodiment 1. Therefore, the construction of the arrangement switcher 85 will be described hereinafter.

Figure 14:
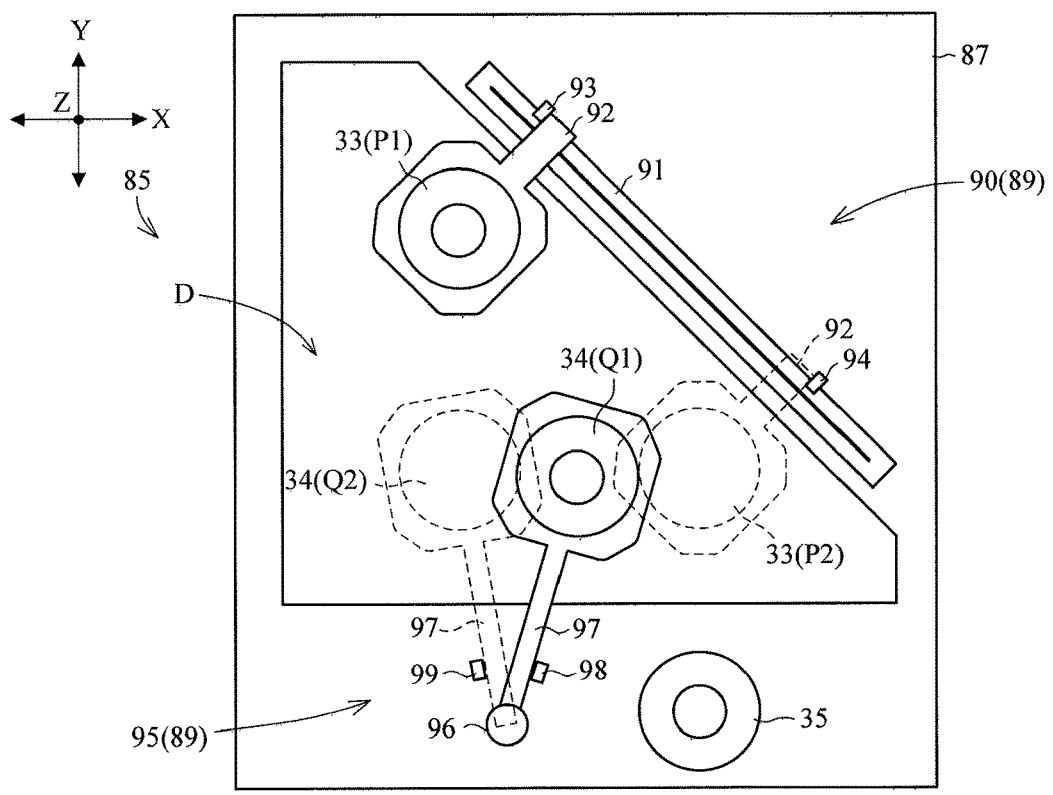
FIG. 14 is a plan view of an arrangement switcher according to Embodiment 5.

FIG. 14 is a plan view of the arrangement switcher 85. The arrangement switcher 85 has a base plate 87 and a moving unit 89. The base plate 87 holds the joint member 35 in a predetermined position. The moving unit 89 supports and moves the joint members 33 and 34.

The moving unit 89 includes a first moving unit 90 for moving the joint member 33, and a second moving unit 95 for moving the joint member 34.

The first moving unit 90 has a rail 91, a holding arm 92 and stoppers 93 and 94. The rail 91 is fixed to the base plate 87. The rail 91 extends substantially horizontally. More particularly, the rail 91 extends in a horizontal direction parallel to a direction for linking position P1 and position P2. The holding arm 92 is slidably attached to the rail 91. The holding arm 92 holds the joint member 33. When the joint member 33 is in position P1, the stopper 93 contacts the holding arm 92 to stop sliding of the holding arm 92. When the joint member 33 is in position P2, the stopper 94 stops the holding arm 92. Such first moving unit 90 moves the joint member 33 linearly.

The second moving unit 95 has a rotary shaft 96, a holding arm 97 and stoppers 98 and 99. The rotary shaft 96 is connected to the base plate 87. The holding arm 97 is connected at a proximal end thereof to the rotary shaft 96 to be swingable. The forward end of the holding arm 97 holds the joint member 34. When the joint member 34 is in position Q1, the stopper 98 contacts the holding arm 97 to stop swinging of the holding arm 97. When the joint member 34 is in position Q2, the stopper 99 stops the holding arm 97. Such second moving unit 95 moves joint member 34 circuitously (in swinging movement).

When switching the joint members 33-35 to the first arrangement, the holding arm 92 is slid until it contacts the stopper 93 to move the joint member 33 to position P1. Further, the holding arm 97 is swung until it contacts the stopper 98 to move the joint member 34 to position Q1. Consequently, the filter coupling device 31 can conveniently be connected to the first filter 21a.

When switching the joint members 33-35 to the second arrangement, the holding arm 97 is swung until it contacts the stopper 99 to move the joint member 34 to position Q2. Further, the holding arm 92 is slid until it contacts the stopper 94 to move the joint member 33 to position P2. Consequently, the filter coupling device 31 can conveniently be connected to the second filter 21b.

Thus, the filter coupling device 31 in Embodiment 5, with the arrangement switcher 85, provides an effect similar to Embodiment 1. That is, the filter coupling device 31 can conveniently couple each of the filters 21a and 21b having the different arrangements of connection openings 23-25.

The arrangement switcher 85 with the moving unit 89 can easily move the joint members 33 and 34. Therefore, the arrangement of joint members 33-35 can easily be switched between the first arrangement and second arrangement.

Since the moving unit 89 supports the joint members 33 and 34, the base plate 87 does not need to support the joint members 33 and 34. The arrangement switcher 85 does not need a construction (e.g. the slots 42 and 43 in Embodiment 1) for guiding the joint members 33 and 34. It is therefore possible to simplify the construction and the like of the base plate 87.

[Embodiment 6]

Embodiment 6 of this invention will be described hereinafter with reference to the drawings.

The substrate treating apparatus 1 in Embodiment 6 is the same as in Embodiment 1, and the outline of the substrate treating apparatus 1 will not be described again. The filter coupling device 31 in Embodiment 6 has an arrangement switcher 100 different from the arrangement switcher 40. Therefore, the construction of the arrangement switcher 100 will be described hereinafter. Components identical to those of Embodiment 1 are shown with the same signs, and will not particularly be described.

Figure 15:
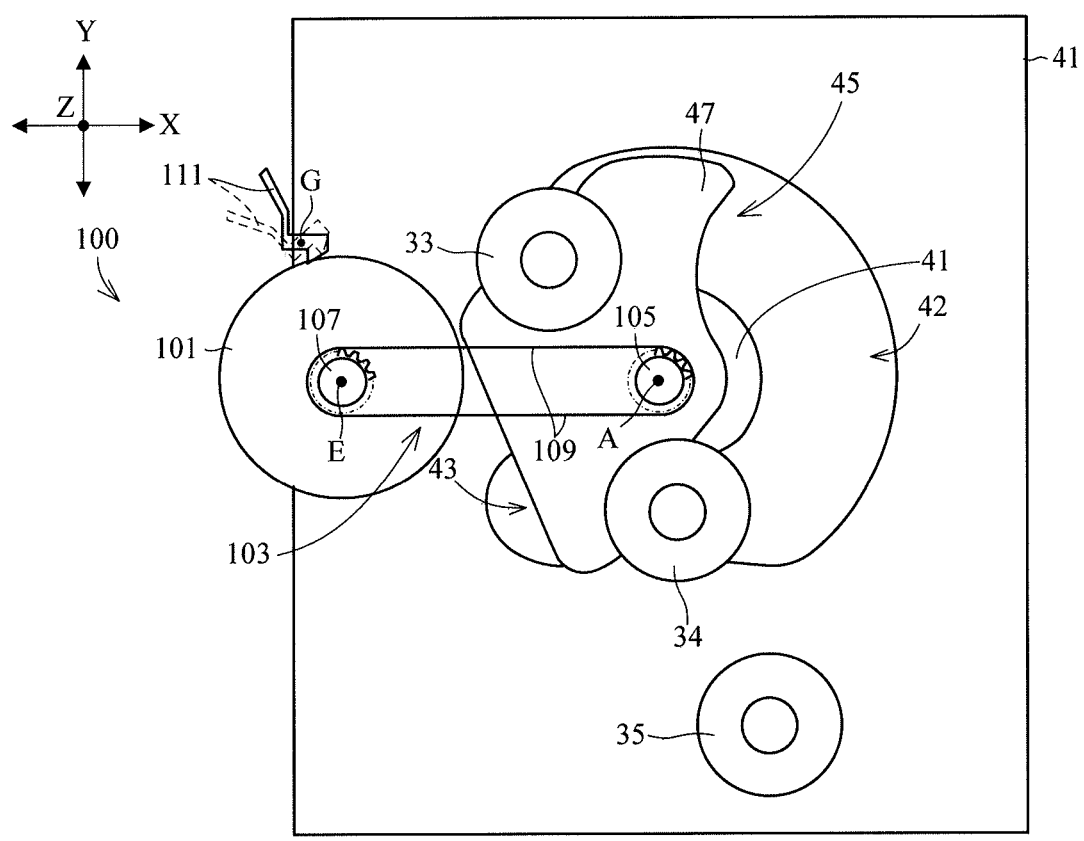
FIG. 15 is a plan view of an arrangement switcher according to Embodiment 6.

FIG. 15 is a plan view of the arrangement switcher 100. The arrangement switcher 100 has a control unit 101 for actuating the moving unit 45. The control unit 101 is a control dial, for example. Specifically, the control unit 101 has a substantially horizontal disk shape. The control unit 101 is supported by the base plate 41 to be rotatable about a substantially vertical axis E. The control unit 101 is operated by the user.

The control unit 101 is interlocked to the moving unit 45 through a transmission device 103. The transmission device 103 transmits to the moving unit 45 a force applied by the user to the control unit 101.

The transmission device 103 has gears 105 and 107 and a belt 109. The gear 105 is fixed to the cam member 47 to rotate about an axis A. The gear 107 is fixed to the control unit 101 to rotate about the axis E. The belt 109 is wound around the gears 105 and 107.

The arrangement switcher 100 has a moving unit lock 111 for prohibiting the moving unit 45 from moving the joint members 33 and 34. The moving unit lock 111 is provided to be movable into and out of engagement with the control unit 101.

Specifically, the moving unit lock 111 is rotatable about a vertical axis G to engage with an outer circumferential surface of the control unit 101. The moving unit lock 111 is, for example, a latch constructed engageable with the control unit 101. When the moving unit lock 111 is engaged with the control unit 101, the moving unit lock 111 directly prohibits movement of the control unit 101, and indirectly prohibits movement of the moving unit 45. When the moving unit lock 111 is separated from the control unit 101, the moving unit lock 111 permits movement of the control unit 101.

When switching the arrangement of joint members 33-35, the user operates (rotates) the control unit 101 in the state where the moving unit lock 111 is separated (disengaged) from the control unit 101. In response to the operation of the control unit 101, the moving unit 45 moves the joint members 33 and 34. After switching the arrangement of joint members 33-35, the user engages the moving unit lock 111 with the control unit 101. Consequently, the movement of the moving unit 45 is prohibited and the arrangement of joint members 33-35 is maintained as the first arrangement or second arrangement.

Thus, the filter coupling device 31 in Embodiment 6, with the arrangement switcher 100, provides an effect similar to Embodiment 1. That is, the filter coupling device 31 can conveniently couple each of the filters 21a and 21b having the different arrangements of connection openings 23-25.

Since the arrangement switcher 100 has the control unit 101, the user can easily operate the moving unit 45.

Since the arrangement switcher 100 has the transmission device 103, the force applied by the user per se to the control unit 101 can act on the moving unit 45. In other words, the moving unit 45 can be moved by the force applied to the control unit 101. It is therefore not necessary for the filter coupling device 31 to have separately a power source for driving the moving unit 45, such as electric or hydraulic equipment.

The arrangement switcher 100, with the moving unit lock 111, can make the joint members 33-35 stand still. For example, the joint member 33 can conveniently be prevented from shifting from positions P1 and P2, and the joint member 34 can conveniently be prevented from shifting from positions Q1 and Q2. The arrangement of joint members 33-35 can therefore be kept as the first arrangement and second arrangement reliably. It is also possible to prevent the user from making an erroneous operation of the control unit 101.

This invention is not limited to the foregoing embodiments, but may be modified as follows:

(1) In each of the foregoing embodiments, the joint members 33-35 are connected to the connection openings 23-25 of the filters 21. This invention is not limited to this. For example, one end of the primary piping 11a and one end of the secondary piping 11b may connect directly to the connection openings 23 and 24. Specifically, the filter coupling device 31 may have an arrangement switcher for holding, moving or guiding the one end of the primary piping 11a and the one end of the secondary piping 11b. In this modified embodiment, the one end of the primary piping 11a and the one end of the secondary piping 11b are examples of the connection ports in this invention.

(2) In each of the foregoing embodiments, no power source is provided for driving the moving unit 45, 89, 90 or 95. The invention is not limited to this. That is, the arrangement switcher may have a power source for driving the moving unit 45.

(3) The constructions of the arrangement switchers 40, 70, 80, 82, 85 and 100 in the foregoing embodiments may be further combined. For example, the arrangement switcher in each forgoing embodiment may further include the joint holders 73 and 74 described in Embodiment 2. Similarly, the arrangement switcher in each forgoing embodiment may include the stoppers 83 and 84 of Embodiment 4. Similarly, the arrangement switcher in each forgoing embodiment may include at least one of the control unit 101 and the moving unit lock 111 of Embodiment 6.

(4) The moving unit lock 111 in foregoing Embodiment 6 is provided to engage (contact) the control unit 101. The invention is not limited to this. For example, the moving unit lock 111 may engage (contact) the moving unit 45 or the transmission device 103 to prohibit movement of the moving unit 45.

(5) In each of the foregoing embodiments, the arrangement switcher 40, 70, 80, 82, 85 or 100 can switch between two arrangements (specifically, the first arrangement and second arrangement). The invention is not limited to this. For example, the arrangements provided by the arrangement switcher may be changed to three or more. That is, the arrangement switcher may switch the arrangement of joint members 33-35 between three or more arrangements.

(6) In each of the foregoing embodiments, the number of movable connection ports (that is, the joint members whose positions change between the first arrangement and second arrangement) is two (specifically, the joint members 33 and 34). The invention is not limited to this. For example, the number of movable connection ports may be one, or may be three. The movable connection ports may be part of the connection ports 33, 34 and 35. Or the movable connection ports may be all of the connection ports 33, 34 and 35.

(7) In each of the foregoing embodiments, the filters 21a and 21b each have three connection openings 23-25. The invention is not limited to this. Each filter 21 may have two or four or more connection openings. With such a change, the number of joint members 33-35 provided for the filter coupling device may be changed. Consequently, the filter coupling device 31 can conveniently be connected with such filters 21.

(8) In each of the foregoing embodiments, the pin members 55 are fixed to the filter support 50, and the groove portions 59 for up-and-down movement, groove portions 60a for first locking, and groove portions 60b for second locking are formed in the base portion (specifically, for example, the side wall portions 57). The invention is not limited to this. The groove portions 59 for up-and-down movement, groove portions 60a for first locking, and groove portions 60b for second locking may be formed in the filter support 50 (e.g. the arm portions 53), and the pin members 55 may be connected fixedly to the base portion (e.g. the side wall portions 57).

(9) In each of the foregoing embodiments, the groove portions for locking are formed in two different height positions. The invention is not limited to this. The groove portions for locking may be formed in three or more different height positions. For example, the filter coupling device 31 may have groove portions for third locking formed in a height position different from both the groove portions 60a for first locking and the groove portions 60b for second locking.

(10) In each of the foregoing embodiments, the filter support 50 supports the filters 21 by placing the filters 21 thereon. The invention is not limited to this. The filter support 50 may support the filters 21 by gripping the filters 21.

(11) In each of the foregoing embodiments, one end edge 42a of the slot 42 provides position P1 of the joint member 33. The invention is not limited to this. That is, one end edge 42a of the slot 42 does not need to provide position P1 of the joint member 33. Similarly, the other end edge 42b of the slot 42 provides position P2 of the joint member 33. The invention is not limited to this. That is, the other end edge 43a of the slot 42 does not need to provide position P2 of the joint member 33. For example, only one of the one end edge 42a and the other end edge 42b of the slot 42 may provide either position P1 or position P2 of the joint member 33. A similar change is possible for the slot 43.

(12) In foregoing Embodiments 1 and 6, the cam member 47 is disposed above the base plate 41. The invention is not limited to this. The cam member 47 may be disposed below the base plate 41.

(13) In foregoing Embodiment 6, the control dial has been described as an example of the control unit 101. The invention is not limited to this. For example, the control unit 101 may be a button, lever, handle or the like.

(14) In foregoing Embodiment 6, the transmission device 103 includes the gears 105 and 107 and the belt 109. The invention is not limited to this. For example, the belt 109 may be omitted and the transmission device may consist only of gears. The transmission device 103 has two gears 105 and 107. The invention is not limited to this. The transmission device 103 may have only one gear. Or the transmission device 103 may have three or more gears. The transmission device 103 may be formed of a gear mechanism, belt mechanism, linkage mechanism or the like. Or the transmission device 103 may include at least one or more of the gear mechanism, belt mechanism and linkage mechanism.

(15) Each of the foregoing embodiments and each of the modified embodiments described in paragraphs (1) to (14) may be further varied as appropriate by replacing or combining their constructions with the constructions of the other modified embodiments.

This invention may be embodied in other specific forms without departing from the spirit or essential attributes thereof and, accordingly, reference should be made to the appended claims, rather than to the foregoing specification, as indicating the scope of the invention.

The invention claimed is:

1. A filter coupling device for coupling a filter, comprising:
    a plurality of connection ports for connection to a plurality of connection openings of the filter;
    an arrangement switcher for switching an arrangement of the connection ports between a first arrangement and a second arrangement;
    a filter support for supporting the filter;
    an up-and-down movement portion for allowing up-and-down movement of the filter support;
    up-and-down movement locking portions for prohibiting the up-and-down movement of the filter support, respectively when the filter support is in a first height position and when the filter support is in a second height position; and
    a base portion for supporting the filter support through the up-and-down movement portion;
    wherein the up-and-down movement portion includes:
    groove portions for up-and-down movement formed in one of the base portion and the filter support to extend vertically; and
    pin members fixed to the other of the base portion and the filter support to be slidable along the groove portions for up-and-down movement;
    the up-and-down movement locking portions include:
    groove portions for first locking formed in one of the base portion and the filter support to extend substantially horizontally from the groove portions for up-and-down movement and to allow sliding of the pin members; and
    groove portions for second locking formed in one of the base portion and the filter support to extend substantially horizontally from the groove portions for up-and-down movement and to allow sliding of the pin members;
    the groove portions for first locking and the groove portions for second locking being located at different heights.

2. A filter coupling device for coupling a filter, comprising:
    a plurality of connection ports for connection to a plurality of connection openings of the filter;
    an arrangement switcher for switching an arrangement of the connection ports between a first arrangement and a second arrangement, by changing positions relative to each of the connection ports;
    a filter support for supporting the filter;
    an up-and-down movement portion for allowing up-and-down movement of the filter support;
    up-and-down movement locking portions for prohibiting the up-and-down movement of the filter support, respectively when the filter support is in a first height position and when the filter support is in a second height position;
    a base portion for supporting the filter support through the up-and-down movement portion;
    wherein the up-and-down movement portion includes:
    groove portions for up-and-down movement formed in one of the base portion and the filter support to extend vertically; and
    pin members fixed to the other of the base portion and the filter support to be slidable along the groove portions for up-and-down movement;
    and wherein the up-and-down movement locking portions include:
    groove portions for first locking formed in one of the base portion and the filter support to extend substantially horizontally from the groove portions for up-and-down movement and to allow sliding of the pin members; and groove portions for second locking formed in one of the base portion and the filter support to extend substantially horizontally from the groove portions for up-and-down movement and to allow sliding of the pin members;

the groove portions for first locking and the groove portions for second locking being located at different heights.

3. A filter coupling device for coupling a filter, comprising:

a plurality of connection ports for connection to a plurality of connection openings of the filter;

an arrangement switcher for switching an arrangement of the connection ports between a first arrangement and a second arrangement, by changing positions relative to each of the connection ports;

wherein the connection ports, when in the first arrangement, are connectable to a plurality of first connection openings of a first filter;

the connection ports, when in the second arrangement, are connectable to a plurality of second connection openings of a second filter; and the second connection openings are in a relative arrangement different from a relative arrangement of the first connection openings.

4. The filter coupling device according to claim 3, wherein:

one of the connection ports is a first connection port further connected to a primary pipe; and one of the connection ports other than the first connection port is a second connection port further connected to a secondary pipe.

5. The filter coupling device according to claim 4, wherein one of the connection ports other than the first connection port and the second connection port is a third connection port further connected to a vent pipe.

* * * * *